United States Patent
Nagata et al.

(10) Patent No.: US 9,611,892 B2
(45) Date of Patent: Apr. 4, 2017

(54) MAGNETIC FLUID SEALED BEARING AND FISHING REEL INCLUDING THE SAME

(71) Applicant: Globeride, Inc., Tokyo (JP)

(72) Inventors: Shinichiro Nagata, Tokyo (JP); Takeshige Ohara, Tokyo (JP); Hiromu Yasuda, Tokyo (JP)

(73) Assignee: GLOBERIDE, INC, Tokyo (JP)

( * ) Notice: Subject to any disclaimer, the term of this patent is extended or adjusted under 35 U.S.C. 154(b) by 0 days.

(21) Appl. No.: 14/808,792

(22) Filed: Jul. 24, 2015

(65) Prior Publication Data
US 2016/0032979 A1 Feb. 4, 2016

(30) Foreign Application Priority Data

Jul. 29, 2014 (JP) .................... 2014-154006
Nov. 28, 2014 (JP) .................... 2014-241783

(51) Int. Cl.
| | |
|---|---|
| *F16C 33/82* | (2006.01) |
| *F16C 33/76* | (2006.01) |
| *F16C 33/78* | (2006.01) |
| *F16J 15/43* | (2006.01) |
| *A01K 89/01* | (2006.01) |
| *A01K 89/015* | (2006.01) |

(52) U.S. Cl.
CPC ........ *F16C 33/765* (2013.01); *A01K 89/0193* (2015.05); *A01K 89/011223* (2015.05); *F16C 33/7846* (2013.01); *F16C 33/7889* (2013.01); *F16J 15/43* (2013.01)

(58) Field of Classification Search
CPC .................................................... F16C 33/765
See application file for complete search history.

(56) References Cited

U.S. PATENT DOCUMENTS

| | | | | |
|---|---|---|---|---|
| 4,293,137 A | * | 10/1981 | Ezekiel .................. | F16J 15/43 |
| | | | | 277/410 |
| 4,692,826 A | * | 9/1987 | Raj ........................ | F16C 33/765 |
| | | | | 277/410 |
| 5,051,853 A | * | 9/1991 | Hosoya .................. | F16J 15/43 |
| | | | | 277/347 |
| 9,091,302 B2 | * | 7/2015 | Ohara .................... | F16C 19/06 |

(Continued)

FOREIGN PATENT DOCUMENTS

| JP | S57-33222 | 2/1982 |
|---|---|---|
| JP | 02-076224 | 6/1990 |

(Continued)

OTHER PUBLICATIONS

Extend European Search Report dated Jan. 20, 2016 for Appln. No. 15178445.1.

*Primary Examiner* — Thomas R. Hannon
(74) *Attorney, Agent, or Firm* — Pillsbury Winthrop Shaw Pittman, LLP

(57) ABSTRACT

In a bearing according to an embodiment, a pair of magnets is arranged such that sides of the magnets opposed to each other with rolling members interposed therebetween have different magnetic polarities from each other. A magnetic fluid sealed bearing according to another embodiment includes a non-magnetic spacer disposed between a magnet of one of magnetic fluid seals and a magnet of the other of the magnetic fluid seals so as to form a magnetic circuit that penetrates outer and inner rings and goes around the rolling members.

11 Claims, 18 Drawing Sheets

(56) References Cited

U.S. PATENT DOCUMENTS

| | | | |
|---|---|---|---|
| 9,408,376 B2* | 8/2016 | Ohara | ............... F16C 32/0406 |
| 2015/0063733 A1 | 3/2015 | Ohara | |
| 2015/0122930 A1* | 5/2015 | Ohara | ............... F16C 33/765 |
| | | | 242/321 |

FOREIGN PATENT DOCUMENTS

| | | |
|---|---|---|
| JP | 10-066295 | 3/1998 |
| JP | 2013-228044 | 11/2013 |

* cited by examiner

MAGNETIC FLUID SEALED BEARING AND FISHING REEL INCLUDING THE SAME

CROSS-REFERENCE TO RELATED APPLICATIONS

This application is based on and claims the benefit of priority from Japanese Patent Application No. 2014-154006 (filed on Jul. 29, 2014) and Japanese Patent Application No. 2014-241783 (filed on Nov. 28, 2014), the contents of which are hereby incorporated by reference in their entirety.

TECHNICAL FIELD

The present disclosure relates to a magnetic fluid sealed bearing that is provided in various drive force transmission mechanisms in such a manner that the bearing supports a rotation shaft rotatable so as to prevent, with the magnetic fluid, foreign substances such as dusts and water from entering into an inner portion of the mechanism. The disclosure also relates to a fishing reel in which such a magnetic fluid sealed bearing is provided as a support member for a rotation shaft of a drive force transmission mechanism.

BACKGROUND

Conventional rotation shafts provided in various drive force transmission mechanisms are rotatably supported via bearings. For such rotation shafts, so-called ball bearings are used in order to improve rotation performance of the rotation shafts. Such ball bearings include multiple rolling members (rolling elements) circumferentially disposed between inner and outer rings.

Such ball bearings (hereunder referred to as "bearings") are used as support members for rotation shafts of drive force transmission mechanisms in various drive units, and some drive units are desired to prevent foreign substances such as dusts and water from penetrating through the bearings into the units. Moreover, when foreign substances enter into the bearings themselves, rotation performance of such shafts could be deteriorated and noise could be caused.

In order to prevent such a problem, a magnetic fluid sealed bearing that includes a magnet and a retaining plate (a polar plate) between an inner ring and outer ring of the bearing to form a magnetic circuit. Magnetic fluid is retained by the magnetic circuit and thereby the inside of the bearing is tightly sealed. Japanese Patent Application Publication No. S57-033222 (the "'222 Publication") discloses such a magnetic fluid sealed bearing. In the magnetic fluid sealed bearing, the magnet and the polar plate are fixed to the outer ring so as to create a clearance between the inner ring and the outer ring, and magnetic fluid is retained within the clearance. In this manner the inside of the bearing is sealed.

Because the clearance is sealed with the magnetic fluid in the above-described magnetic fluid sealed bearing, it is possible to enhance the sealing of the inner portion of the bearing without reducing the rotation performance compared to other sealing structures such as rubber. However, there is a possibility that a sufficient sealing cannot be provided at the side where the magnet and retaining plate are fixed (the outer ring side).

For this reason, the '222 Publication discloses a magnetic fluid sealed bearing in which the fixed side of the magnet and the retaining plate (press-fitted side) is also filled with the magnetic fluid in order to enhance the sealing of the inner portion of the bearing. More specifically, the magnet attached to the retaining plate is magnetized such that the magnetic poles point in the axial direction so that the magnetic circuits are formed on the inner and outer ring sides symmetrically with the axial direction. Sealing films made of the magnetic fluid are formed on the outer and inner ring sides by retaining the magnetic fluid in each of the magnetic circuits and the sealing of the inner portion can be enhanced.

As another means to handle the problem, an elastic seal member is provided on a portion of the periphery of a rotation shaft proximate to a bearing to shut out water and dusts from the bearing, however, the rotation performance of the rotation shaft may be degraded due to contact pressure caused by the elastic seal member.

A bearing with a magnetic fluid sealing using magnetic fluid (hereunder referred to as a magnetic fluid sealed bearing) is known for preventing foreign substances from penetrating through the bearing without degrading the rotation performance of the rotation shaft. For instance, the '222 Publication discloses a magnetic fluid seal (magnetic sealing mechanism) with a ball bearing that includes a rolling member between the outer and inner rings. A magnetic body is interposed between the outer ring and the inner ring that rotate relatively to each other and one side of the magnetic body is fixed and other side of the magnetic body is provided with magnetic fluid in the clearance.

The magnetic fluid seal includes a magnet forming a magnetic circuit with the inner ring or the outer ring, a retaining plate retaining the magnet, and a magnetic fluid retained between the inner ring or the outer ring and the retaining plate. The magnetic fluid is retained by the magnetic circuit and thereby the inner portion of the bearing body is sealed. More specifically, magnetic body is disposed between the inner ring and the outer ring, one side of the magnetic body is fixed, and a magnetic fluid is provided in a clearance on the other side of the magnetic body thereby the rolling member is hermetically sealed. In this way, penetration of foreign substances into the rolling member section can be prevented.

The magnetic fluid sealed bearings disclosed in the '222 Publication and Japanese Patent Application Publication No 2013-228044 include the rolling member commonly made of a magnetic material such as SUS440C. The magnet of the magnetic fluid sealing forms a magnetic circuit in a small area formed between the magnet and the outer or inner ring disposed closely to the magnet. A strong magnetic force generated from the magnetic circuit acts on the rolling member and consequently a magnetic attraction force between the rolling member and the inner or outer ring is increased. This works as resistance that hampers the rotation of the rolling member. In other words, the rolling member is attracted toward the inner or outer ring by the magnetic force and this hampers the smooth rotation of the rolling member (increases the rotational torque).

As described above, the magnetic fluid sealed bearing can improve the sealing quality of the bearing compared with conventional bearing but still have the drawback that the magnetic circuit generated by the magnet largely affects the rolling member and the rotational torque is increased (reducing the ease of rotation).

Solving this disadvantage related to the magnetic fluid sealed bearing is important especially for the bearing function in a rotational driving section of fishing reels that are required a high rotation performance (a high free-rotation performance with a low torque) in addition to a water and dust prevention feature.

SUMMARY

The present disclosure addresses the above drawbacks. One object of the present disclosure is to provide a magnetic fluid sealed bearing in which smooth rotation of the rolling member is realized with a reduced rotational torque and to provide a fishing reel including the same.

A magnetic fluid sealed bearing according to one embodiment may include a bearing body. The bearing body including an inner ring, an outer ring, and a plurality of rolling members interposed between the inner ring and the outer ring. The bearing further include a pair of ring-shaped magnets disposed in an annular space between the inner ring and the outer ring, the pair of ring-shaped magnets being disposed on each side of the bearing body in an axial direction with the rolling members interposed therebetween; and magnetic fluid retained by a magnetic circuit formed by the pair of magnets to seal the rolling members. The pair of magnets are magnetized such that magnetic poles point in the axial direction of the bearing body, and opposing sides of the pair of magnets have different magnetic polarities from each other.

With this configuration, the magnetic attraction force between the rolling members and the inner and outer rings is suppressed by the magnetic field (the magnetic attraction force) acting on the axial direction of the bearing body between the magnets, and thereby the rolling members are not so pressed toward the inner and outer rings and can smoothly rotate between the inner ring and the outer ring (a high free-rotation performance can be realized) (since a rotational torque of the rolling members can be reduced, the relative rotation between the inner ring and the outer ring of the bearing body becomes smooth).

More specifically, when the opposing faces of the pair of magnets have the same magnetic polarity, strong magnetic fields in the radial direction are generated around the magnets respectively due to the repulsive force between the magnets and the like. The rolling members are pressed toward the inner and outer rings (especially the inner ring) due to the strong radial magnetic fields. Whereas when the opposing faces of the magnets have a different magnetic pole as is the configuration of the present disclosure, the magnetic force acting on the rolling members in the radial direction is smaller compared to the above case where the opposing faces have the same magnetic pole, furthermore, the magnetic force acting on the rolling members in the axial direction becomes larger than that in the radial direction. The magnetic attraction force between the rolling members and the inner and outer rings is suppressed by the strong axial magnetic field (the axial strong magnetic attraction force and thereby the smooth rotation of the rolling members is realized. In other words, according to the configuration, it is possible to realize smooth rotation of the rolling member by reducing the rotational torque while high sealing quality is secured with the magnetic fluid.

A magnetic fluid sealed bearing according to another embodiment includes a bearing body, a magnetic inner ring, a magnetic outer ring, a plurality of magnetic rolling members interposed between the inner ring and the outer ring, a pair of magnetic fluid seals integrally retained on each side of the bearing body in an axial direction with the rolling members interposed therebetween so as to magnetically seal an inner portion of the bearing body. Each of the pair of magnetic fluid seals includes a magnet, a polar plate retaining the magnet, and magnetic fluid retained in a clearance between the inner or outer ring and the magnet, the magnet of the each of the pair of magnetic fluid seals is attached to the one of the inner and outer rings with a non-magnetic spacer interposed therebetween and retains the magnetic fluid on the other of inner and outer rings to seal the rolling members.

According to the above configuration, the magnets of the pair of magnetic fluid seals disposed on the both sides of the rolling members are attached to the inner or outer ring via the non-magnetic spacer interposed therebetween. Therefore, a magnetic circuit is not formed in a small area between the spacer and the inner or outer ring disposed close thereto. In other words, it is possible to form a magnetic circuit over a wide region between the magnets in the pair of magnetic fluid seals disposed on each side of the bearing body in the axial direction with the rolling members interposed therebetween. Therefore, a strong magnetic force does not act on the rolling members. Accordingly, the magnetic force generated by the magnetic circuit does not adversely affect the movement of the rolling members and it is possible to realize a smooth rotation of the rolling members (since a rotational torque of the rolling members can be reduced, the relative rotation between the inner ring and the outer ring of the bearing body becomes smooth).

According to the present disclosure, it is possible to obtain a magnetic fluid sealed bearing in which smooth rotation of the rolling members is realized with a reduced rotational torque and to obtain a fishing reel including the same.

DESCRIPTION OF THE PREFERRED EMBODIMENTS

Figure 1:
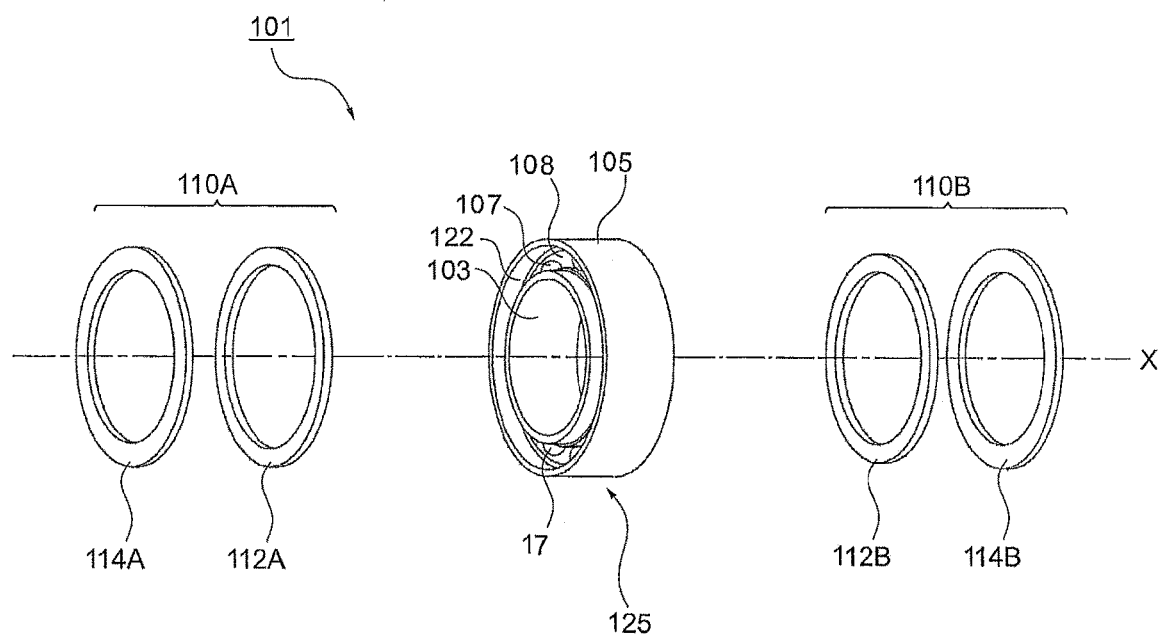
FIG. 1 is an exploded perspective view of a magnetic fluid sealed bearing according to a first embodiment of the disclosure.
Figure 2:
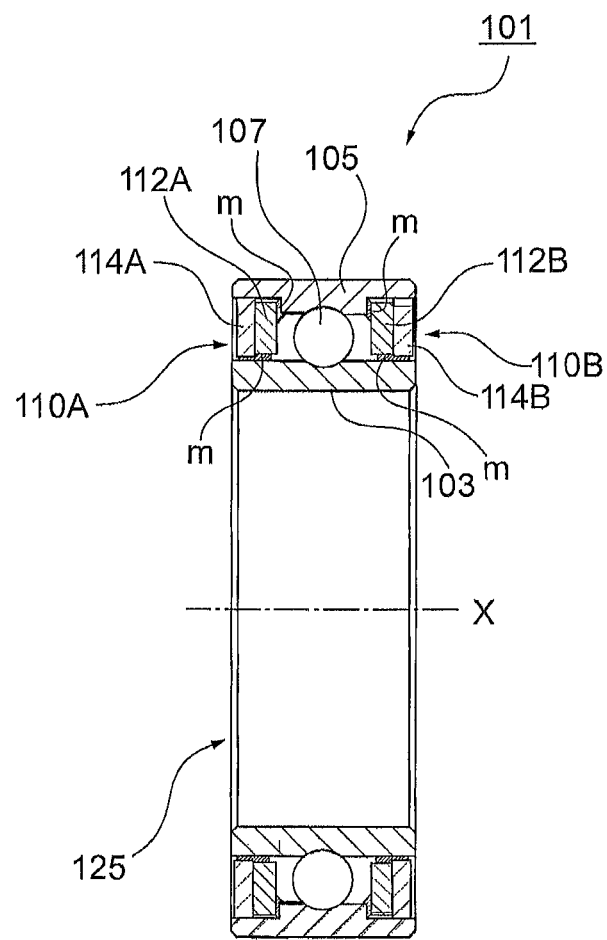
FIG. 2 is a sectional view of the magnetic fluid sealed bearing of FIG. 1 along the axial direction.
Figure 3:
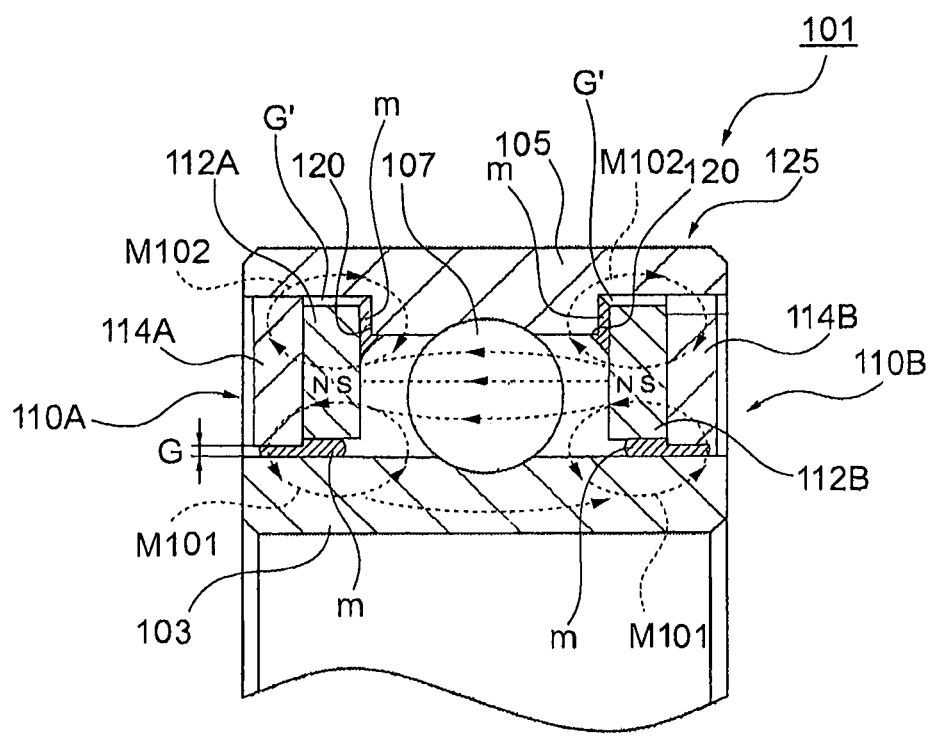
FIG. 3 is an enlarged sectional view of an essential portion of FIG. 2 with magnetic lines.

An embodiment of a magnetic fluid sealed bearing according to the disclosure will be hereinafter described with reference to the accompanying drawings. FIGS. 1 to 3 illustrate a magnetic fluid sealed bearing according to a first embodiment of the disclosure. FIG. 1 is an exploded perspective view of the magnetic fluid sealed bearing, FIG. 2 is a sectional view of the magnetic fluid sealed bearing of FIG. 1 along the axial direction, and FIG. 3 is an enlarged sectional view of an essential portion of FIG. 2.

As illustrated in the drawings, a magnetic fluid sealed bearing 101 (hereunder also referred to as simply the "bearing") may include a bearing body 125 that includes a cylindrical-shaped inner ring 103, a cylindrical-shaped outer ring 105 arranged so as to surround the inner ring 103, and a plurality of rolling members (rolling elements) 107 interposed between the inner ring 103 and the outer ring 105 so as to be rollable therebetween. The rolling members 107 may be retained by an annular-shaped retainer 108 and allow the inner ring 103 and the outer ring 105 to rotate relative to each other.

The inner ring 103, the outer ring 105, and the rolling members 107 may be formed of a magnetic material such as chrome-based stainless steel (SUS440C); and the retainer 108 may be formed of a feebly-magnetic, highly corrosion-resistant, and heat-resistant material such as an austenitic stainless steel material (SUS304).

The magnetic fluid sealed bearing 101 may include a pair of magnetic fluid seals 110A, 110B. More specifically, on each side of the bearing body 125 with respect to the shaft direction (the axial direction "X" of the bearing), the magnetic fluid seals 110A, 110B may be disposed in an opening of an annular space 122 between the inner ring 103 and the outer ring 105 with the rolling members 107 disposed therebetween. The pair of magnetic fluid seals 110A, 110B may be integrally retained by the bearing body 125 (the magnetic fluid seals may be integrated with the bearing body 125 to form an unit with the bearing body 125) and serve as a magnetic seal that seals the inner portion of the bearing body 125.

More specifically, the magnetic fluid seals 110A, 110B may respectively include a ring-shaped magnet 112A (112B) disposed on the axially inner side so as to oppose the rolling members 107, a ring-shaped polar plate 114A (114B) disposed so as to in contact with an axially outer face of the magnet 112A (112B) so as to retain the magnet 112A (112B) from the axially outer side. The magnetic fluid seals 110A, 110B may further respectively include a magnetic fluid "m" retained between the inner ring 103 or the outer ring 105 and the magnet 112A (112B) (retained by a hereunder-described magnetic circuit formed by the magnet 112A (112B)). These components serve as a seal that prevents dusts, water and the like from entering into the rolling members 107.

Thus, the magnet 112A (112B) may be attached to the polar plate 114A (114B) so as to face the rolling members 107 (the polar plate 114A (114B) retains one side of the magnet 112A (112B) and the other side of the magnet 112A (112B) faces the rolling members 107), and either an inner face of the polar plate 114A (114B) disposed closer to the inner ring 103 or an outer face of the polar plate 114A (114B) disposed closer to the outer ring 105 may be fixed. In this embodiment, both of the polar plates 114A, 114B are fixed on the outer ring 105 side.

The magnet 112A (112B) may be a permanent magnet having a high magnetic flux density and a high magnetism, such as a neodymium magnet prepared by sintering. As shown in FIG. 3, the magnet 112A (112B) may be previously magnetized such that the magnetic poles (the S-pole, the N-pole) point in the axial direction x. The polar plate 114A (114B) disposed so as to be in contact with the axially outer face of the magnet 112A (112B) may have a ring shape substantially identical to that of the magnet 112A (112B) as described above, and may be formed of chrome-based stainless steel (SUS440C, SUS420 and the like).

The magnet 112A (112B) and the polar plate 114A (114B) are attached to each other when they are assembled into the bearing, and the magnet and the polar plate may be bonded to each other in advance in the embodiment. However, they may not be bonded by magnetic attraction. When these two elements are previously bonded to each other, the magnet 112A (112B) can be readily positioned or centered, and the magnet 112A (112B) and the polar plate 114A (114B) are integrated into a unit that can be readily built in the bearing body 125.

The magnetic fluid "m" may be prepared by dispersing magnetic fine particles such as $Fe_3O_4$ into a base oil (using a surfactant) so as to have viscosity and react with a magnet brought close. Thus, the magnetic fluid "m" may be stably retained in position by the magnetic circuits (magnetic fields) M101, M102 (see FIG. 3) formed between the magnet 112A (112B) and the inner ring 103, the outer ring 105, and the polar plate 114A (114B) made of a magnetic material.

In the embodiment, a step 120 may be projected from the inner surface of the outer ring 105 toward the rolling members 107 and the step 120 may be formed as an abutting portion for the magnet 112A (112B). Due to the presence of the step 120, the outer ring 105 may be formed to have a thinner region near the opening and a thicker region near the rolling members 107. Thus, the distance between the inner ring 103 and the outer ring 107 is larger in the axially outer regions than in the axially inner region. By providing the step 120, it is possible to perform accurate alignment of the magnetic fluid seal 110A (110B) that is press-inserted from the opening by letting the magnet 112A (112B) touch with the step 120. The step 120 in the embodiment may be formed to have a vertical surface with respect to the axial direction, therefore, the magnet 112A (112B) and the polar plates 114A (114B) that are integrated as a single unit can be inserted through the opening until it contacts (or is attracted by) the step 120 (the vertical surface). Thus, the magnet can be readily positioned and fixed.

The polar plate 114A (114B) may have an outer diameter slightly larger than the inner diameter of the outer ring 105 (at the thinner portion) and may be configured to be press-fitted into the opening of the outer ring 105 along with the magnet 112A (112B) attached thereto (the polar plate 114A (114B) may be fixed on the outer ring 105 side). The polar plate 114A (114B) to which the magnet 112A (112B) is attached may be built in the bearing by loose fitting or magnetic fixing, instead of press-fitting.

The polar plates 114A (114B) which the magnet 112A (112B) is attached thereto may be formed to have a size so as to create a prescribed clearance G with the outer circumferential surface of the inner ring 103 when press-fitted into the outer ring 105. The clearance G is used to retain the magnetic fluid "m." The diameter of the magnet 112A (112B) is set to be smaller than the diameter of the polar plate 114A (114B), and the end surface of the magnet 112 does not protrude out from the end surface of the polar plate 114A (114B) in the radial direction when the magnet 112A (112B) is attached to the polar plate 114A (114B) in the assembled state as illustrated in FIG. 3. It is preferable that the magnet 112A (112B) be attached with a small clearance G' from the inner surface of the outer ring 105 in the assembled state. The small clearance G' may be about 0.05-0.10 mm and the magnetic fluid "m" may be retained in a part or the whole of the small clearance G'. In the embodiment, the magnetic fluid "m" is provided on the both of the inner ring side and the outer ring side. However, the magnetic fluid "m" may be provided only in the clearance G (in other words, when the clearance G is provided on the outer ring 105 side unlike the embodiment, the magnetic fluid "m" is provided only on the outer ring 105 side).

As described above, the magnets 112A, 112B disposed on each side of the bearing body 125 in the axial direction so as to oppose to each other, and the magnets 112A, 112B are magnetized such that the magnetic poles point in the axial direction in the embodiment. More specifically, the pair of magnets 112A, 112B are magnetized such that the sides of the magnets opposed to each other with the rolling members 107 interposed therebetween have different magnetic polarities from each other. In other words, an opposing side of the magnet 112A disposed so as to face one side of the rolling members 107 may be magnetized as the south pole (S pole), whereas an opposing face of the magnet 112B disposed so as to face the other side of the rolling members 107 may be magnetized as the north pole (N pole) (alternatively, the opposing face of the magnet 112A may be magnetized as the N pole and the opposing face of the magnet 112B may be magnetized as the S pole). Thus, between the magnet 112A and the magnet 112B, a strong magnetic field M3 whose magnetic lines are directed from the N pole of the magnet 112B toward the S pole of the magnet 112A is formed as illustrated in FIG. 3. In other words, a magnetic flux generated from the magnet 112B penetrates the rolling members 107 and reaches to the magnet 112A. The magnetic flux then goes through the polar plate 114A, the inner ring 103, and the outer ring 105, and goes back to the magnet 112B to form a loop. In this manner, the magnet 112A and the magnet 112B form the same magnetic circuits. Here, the magnetic circuit that goes through the polar plate 114A, the inner ring 103, the magnet 112B, and the rolling members 107 may be referred to as an inner loop, and the magnetic circuit that goes through the polar plate 114B, the outer ring 105, the magnet 112A, and the rolling members 107 may be referred to as an outer loop. In the embodiment, the magnetic flux penetrating the inner loop and the magnetic flux penetrating the outer loop may be set such that a difference therebetween becomes zero (in other words, the amount of the magnetic flux penetrating the magnetic circuit formed by the pair of magnets 112A, 112B, the rolling members 107, and the inner ring 103 is set to be substantially same as the amount of the magnetic flux penetrating the magnetic circuit formed by the pair of the magnets 112A, 112B, the rolling members 107, and the outer ring 105).

By setting the magnetic poles in the above manner, the direction of the magnetic flux penetrating the rolling members 107 are dominated by the axial component and the radial component becomes very small. In the embodiment, the radial component of the magnetic flux penetrating the rolling members 107 may be almost zero. Generally, it is usually preferable that the axial component is three times or more as large as the radial component. The direction of the magnetic attraction force acting on the rolling members 107 is identical to the direction of the magnetic flux. Therefore, in the embodiment, the radial force does not substantially act on the rolling members 107 and the magnetic attraction force between the inner ring 103 and the outer ring 105 is small. Consequently, the rolling members 107 are not so pressed toward the inner and outer rings 103, 105 and can smoothly rotate between the inner ring 103 and the outer ring 105 (a fine free-ration performance is realized) (because a rotational torque of the rolling members 108 is reduced, the relative rotation between the inner ring 103 and the outer ring 105 of the bearing body 125 becomes smooth). In the embodiment, the rolling members 107 may be disposed at the midpoint of the distance between the magnet 112A and the magnet 112B. Because the magnets 112A, 112B are formed in the identical shape and have the same magnetic force, the same magnitude of the magnetic attraction forces act on the rolling members 107 from the magnets 112A, 112B. Thus, the axial force acting on the rolling members 107 is zero since the two forces equal out (the magnitude of the attraction force acting on the rolling members from one magnet is substantially same as that of the attraction force from the other magnet). Note that this force becomes unstable when the rolling members 107 move in the axial direction. More specifically, when the rolling members 107 are displaced in a small amount in the axial direction, the attraction force from the magnet to which the rolling member gets closer is increased and the rolling members 107 move toward the magnet. However, the axial position of the rolling members 107 is finely fixed with the inner and outer rings and therefore the axial attraction force works on the rolling members 107 is controlled below a prescribed magnitude.

Figure 4A:
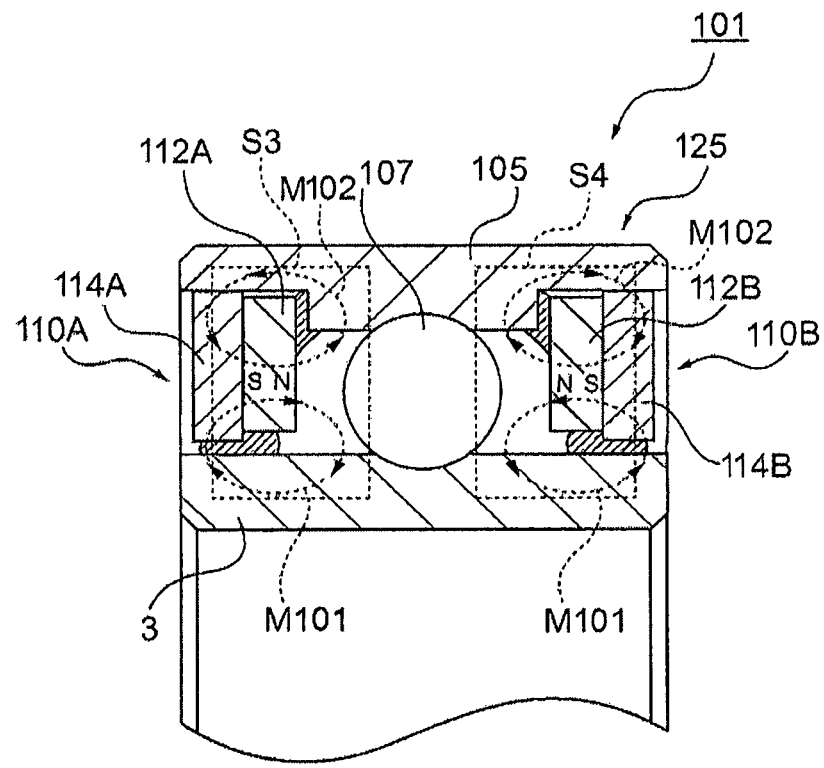
FIG. 4a is an enlarged sectional view of an essential portion schematically illustrating a distribution of magnetic lines of a pair of magnets opposed to each other with a rolling member interposed therebetween and the magnetic poles of the sides opposed to each other are the same.
Figure 4B:
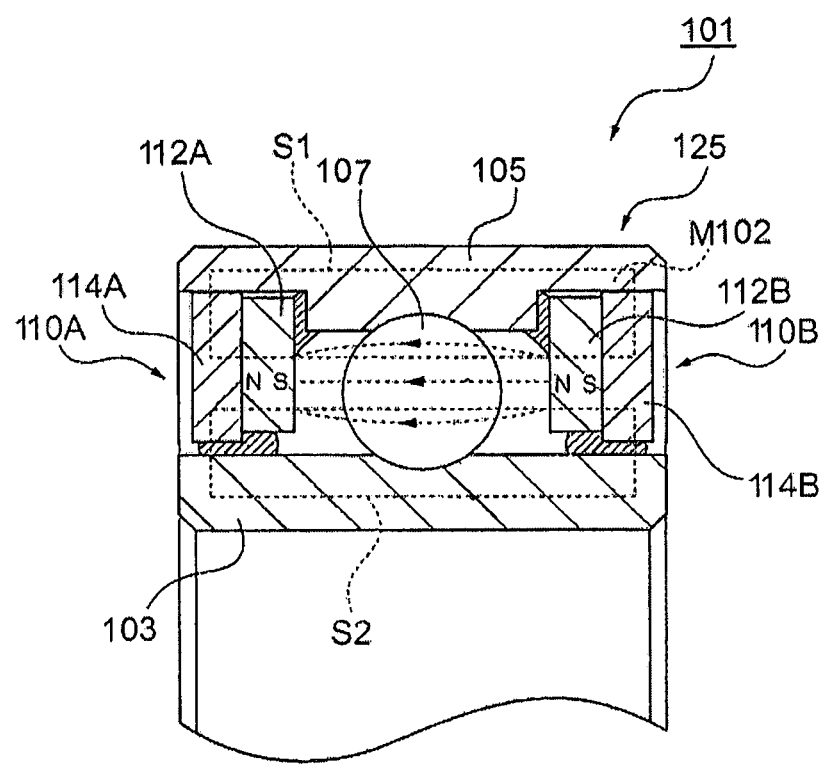
FIG. 4b is an enlarged sectional view of the essential portion schematically illustrating a distribution of magnetic lines of the pair of magnets opposed to each other with a rolling member interposed therebetween and the magnetic poles of the sides opposed to each other are different from each other.

More specifically, when the opposing sides of the pair of magnets 112A, 112*b* have the same magnetic polarity (N pole in the example of FIG. 4*a*) as shown in FIG. 4*a*, strong magnetic fields (strong radial magnetic fields S3, S4 that include magnetic circuits M101, M102) in the radial direction are generated around the magnets 112A, 112B respectively due to the repulsive force between the magnets 112A and 112B and the like. The rolling members 107 are pressed toward the inner and outer rings 103, 105 (especially the inner ring 103) due to the strong radial magnetic fields. Whereas when the opposing faces of the magnets 112A, 112B have a different magnetic pole as is the embodiment illustrated in FIG. 4*b*, the magnetic force acting on the rolling members 107 in the radial direction is smaller compared to the above case where the opposing faces have the same magnetic pole, furthermore, the magnetic force acting on the rolling members 107 becomes larger in the radial direction than the axial direction. The magnetic attraction force between the rolling members 107 and the inner and outer rings 103, 105 is suppressed by the strong axial magnetic field (the axial strong magnetic attraction force: see the strong axial magnetic fields S1, S2), and thereby the smooth rotation of the rolling members 107 is realized. Especially in the embodiment, the magnets 112A, 112B are configured such that the magnetic force acting on the rolling members 107 in the axial direction is larger than that of the radial direction of the bearing body 125.

Figure 5:
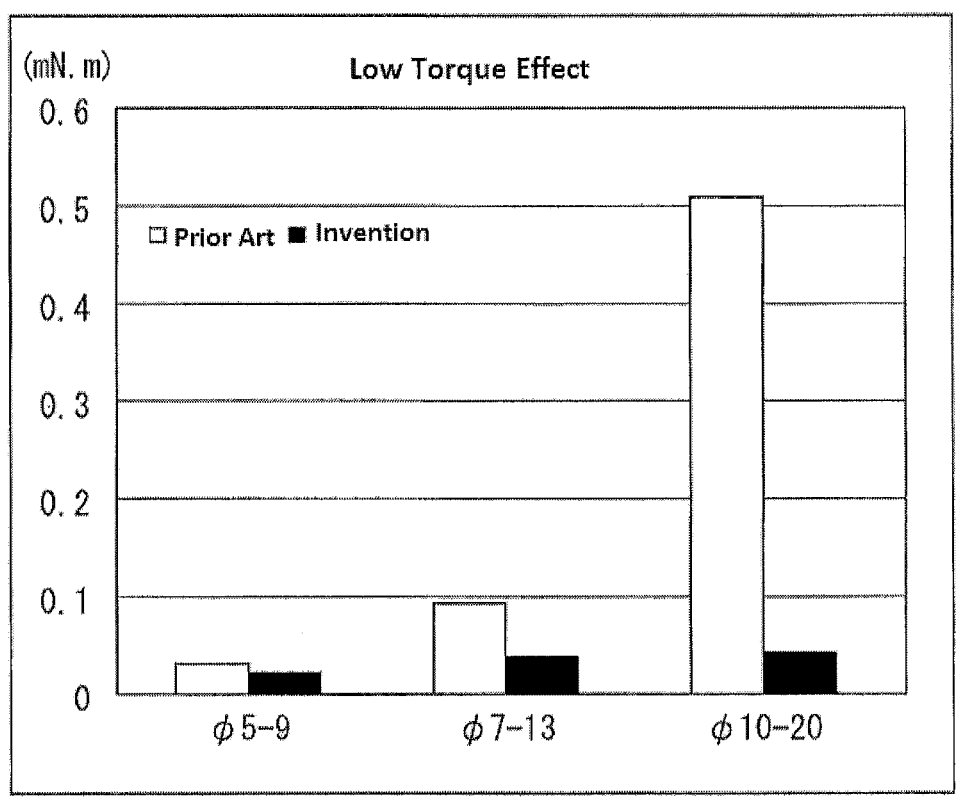
FIG. 5 illustrates a table and a graph showing a low torque effect obtained according to the first embodiment in comparison with prior-arts.

FIG. 5 shows results demonstrating a fine free-rotation performance (a low torque effect) of the rolling members 107 due to the axial magnetic field M3. FIG. 5 shows comparison results of the rotational torque of the rolling member 107 between the prior-art configuration (for example, the configuration of FIG. 4a) and the configuration of the present disclosure (for example, the configuration of FIG. 4b). The comparative table of the torque shows average values of rotational torque measured by a tension gauge or the like for each of three test bodies, the bearing body 125 with the outer diameter of the inner ring 5 mm/the outer diameter of the outer ring 9 mm ($\phi$5-9), the bearing body 125 with the outer diameter of the inner ring 7 mm/the outer diameter of the outer ring 13 mm ($\phi$7-13), and the outer diameter of the inner ring 10 mm/the outer diameter of the outer ring 20 mm ($\phi$10-20). It is visually understood from the graph shown below the torque comparative table that the difference between the prior-art and the present discloser configuration increases as the size of the bearing body 125 increases. The magnitude of this low torque effect (how much the torque is reduced) depends on the size of the bearing body (the inner and outer rings) (the inner and outer diameters, thickness, width), the material, the surface treatment, with or without the polar plate, the arrangements of the polar plates and the like.

As described above, the magnetic fluid sealed bearing 101 according to the embodiment includes the magnetic circuits M101, M102 on each of the inner and outer ring 103, 105 sides to retain the magnetic fluid "m." Therefore, it is possible to securely prevent foreign substances such as water and dusts from entering into the bearing. Especially, the water tends to course along the inner and outer surfaces of the inner and outer rings 103, 105 but it is possible to prevent the water from penetrating into the bearing. As a result, it is possible to keep the rotation performance of the bearing 101 and the smooth rotation of the rotation shaft can be maintained for a long time.

Moreover, in the magnetic fluid sealed bearing 101 described above, the opposing faces of the pair of magnets 112A, 112B opposed with the rolling members 107 interposed therebetween have different magnetic polarities from each other. Therefore the magnetic attraction force acting between the rolling members 107 and the inner and outer rings 103, 105 is reduced by the magnetic field (magnetic attraction force) M3 formed in the axial direction X of the bearing body 12 between the magnets 112A, 112B. Consequently, the rolling members 107 are not so pressed toward the inner and outer rings 103, 105 and can smoothly rotate between the inner ring 103 and the outer ring 105 (a fine free-ration performance is realized) (because a rotational torque of the rolling members 107 is reduced, the relative rotation between the inner ring 103 and the outer ring 105 of the bearing body 125 becomes smooth).

Figure 6:
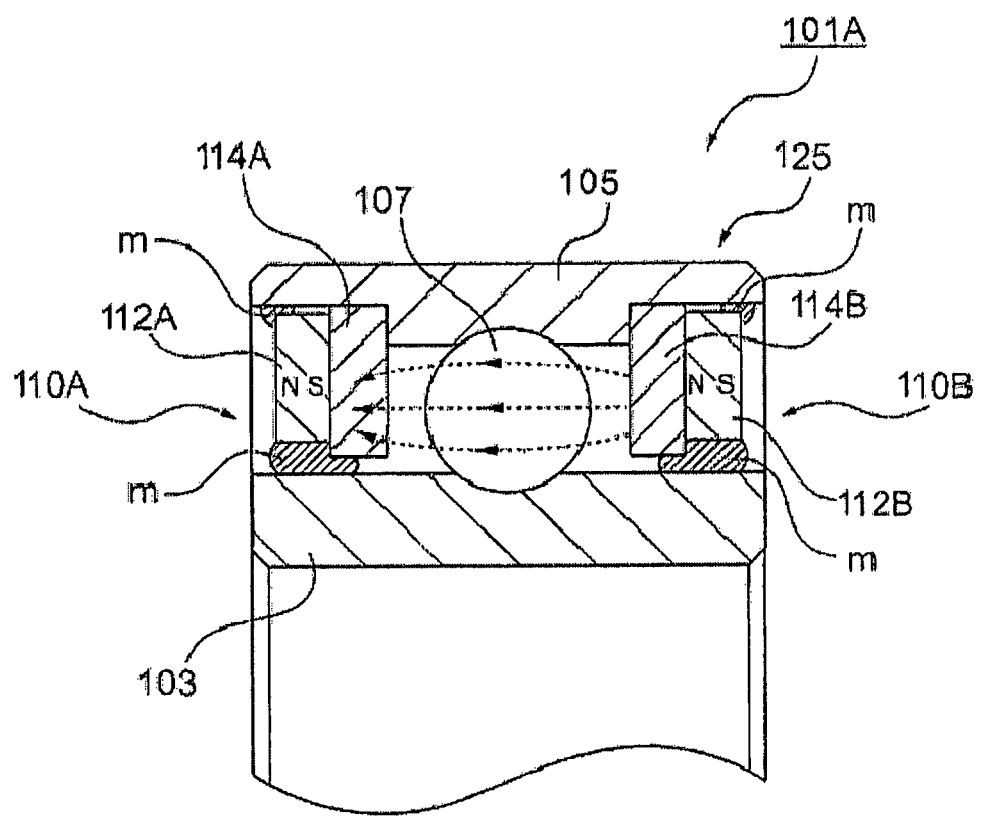
FIG. 6 is an enlarged sectional view of an essential portion of a magnetic fluid sealed bearing according to a second embodiment of the disclosure.

FIG. 6 is an exploded perspective view of a magnetic fluid sealed bearing 101A according to a second embodiment of the disclosure. Referring to FIG. 6, in the magnetic fluid seals 110A, 110B, the positions of the magnets 112A, 112B and the polar plates 114A, 114B in the axial direction are opposite to those of the first embodiment. In other words, the polar plates 114A, 114B may be disposed on the inner side of the magnets 112A, 112B (closer to the rolling members 107). Again, the magnetic fluid "m" is retained by the magnetic circuit between the magnets 112A, 112B and the inner and outer rings 103, 105. Moreover, the pair of magnets 112A, 112B are magnetized such that the sides of the magnets opposed to each other with the rolling members 107 interposed therebetween have different magnetic polarities from each other. Therefore, the structure according to the second embodiment can achieve the same technical effects as in the first embodiment. In the above configuration, a cover may be provided on the opening of the bearing body 125 so as to hide the magnets 112A, 112B exposed to the outside.

Figure 7:
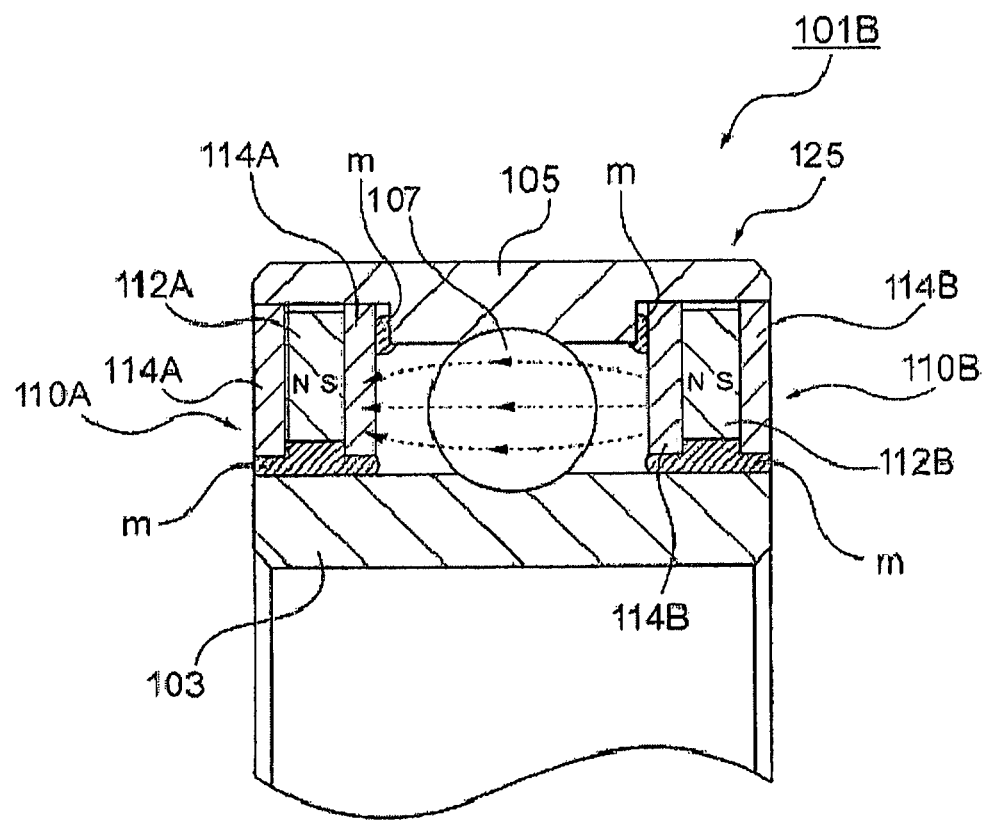
FIG. 7 is an enlarged sectional view of an essential portion of a magnetic fluid sealed bearing according to a third embodiment of the disclosure.

FIG. 7 is an exploded perspective view of a magnetic fluid sealed bearing 101B according to a third embodiment of the disclosure. Referring to FIG. 7, in the magnetic fluid seals 110A, 110B, the magnet 112A (112B) may be sandwiched between a pair of the polar plates 114A, 114A (114B, 114B). The magnetic fluid "m" may be retained on the both of the inner and outer rings 103, 105 sides by the magnetic circuit. Moreover, the pair of magnets 112A, 112B are magnetized such that the sides of the magnets opposed to each other with the rolling members 107 interposed therebetween have different magnetic polarities from each other. Therefore, the structure according to the third embodiment can achieve the same technical effects as in the first embodiment.

The above-described magnetic fluid sealed bearings 101, 101A, 101B can be used as a support member for a rotation shaft in various driving unit. For example, it can be used as a support member for a rotation shaft of a drive force transmission mechanism installed on various fishing reels (a spinning reel, a double-bearing reel, an electric reel, and the like). Fishing reels are usually used under a harsh environment where water, salts, sands, dusts and the like exist. When the above-described magnetic fluid sealed bearings 101, 101A, 101B are installed in the fishing reels, the rotation performance of the rotation shaft rotationally driven by handle operation or the like can be enhanced and it is possible to keep stable rotation of the rotation shaft for a long period.

When the above-described low-torque bearing is used as a support member for a spool shaft of a double-bearing reel which is used for casting among others, it is possible to enhance free-rotation of the spool in addition to the water and dust proof effects.

Figure 8:
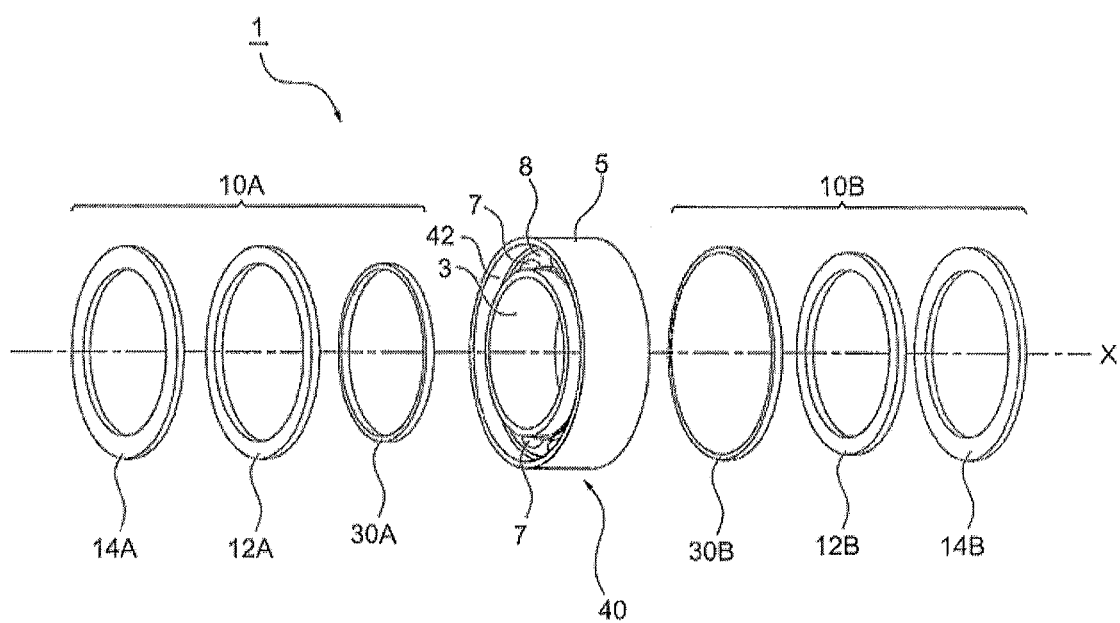
FIG. 8 is an exploded perspective view of a magnetic fluid sealed bearing according to a fourth embodiment of the disclosure.
Figure 9:
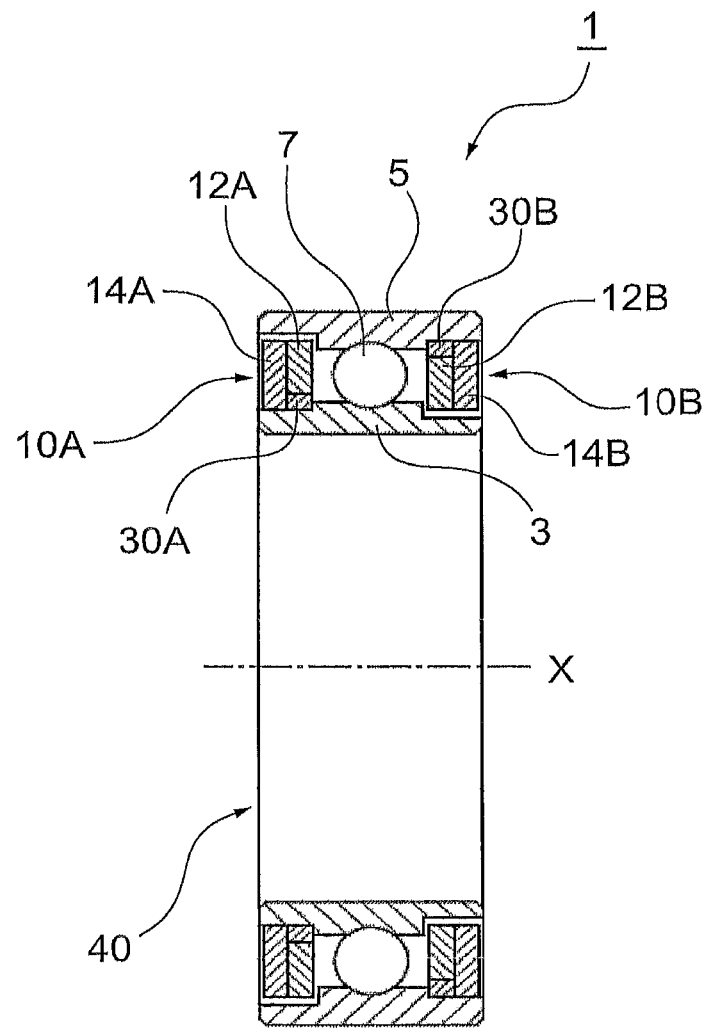
FIG. 9 is a sectional view of the magnetic fluid sealed bearing of FIG. 8 along the axial direction.
Figure 10:
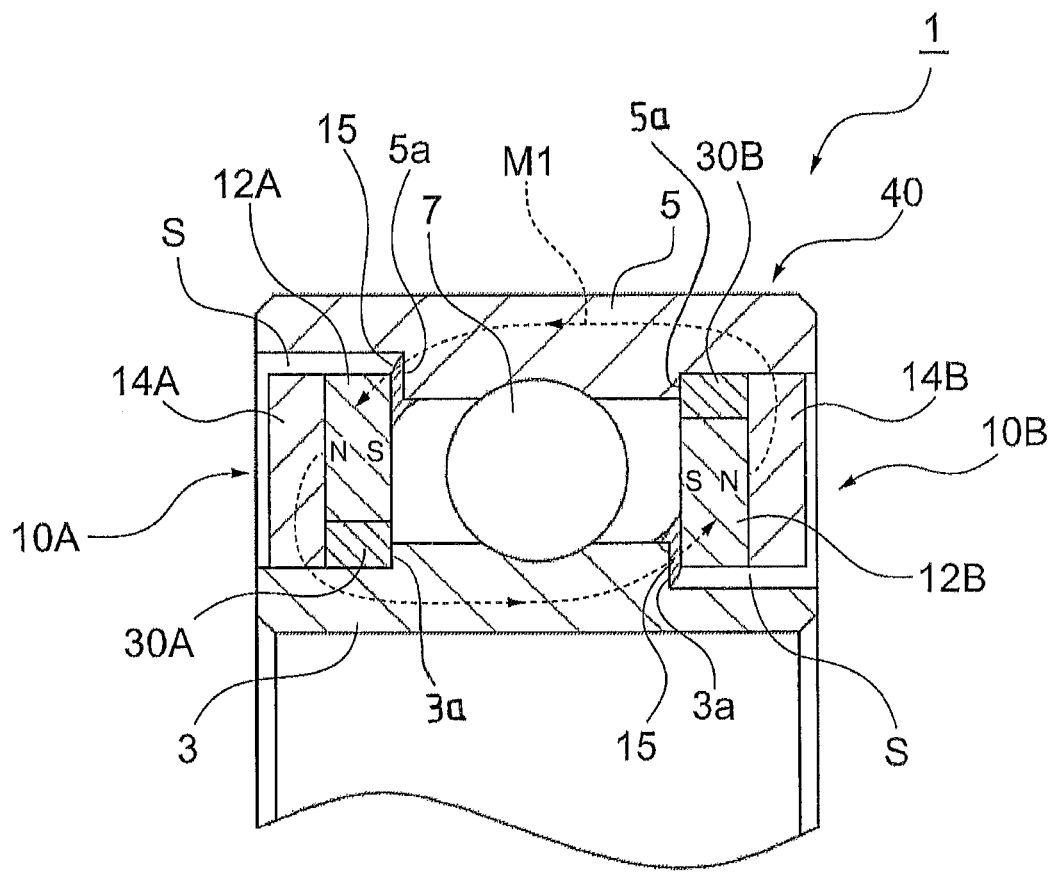
FIG. 10 is an enlarged sectional view of an essential portion of FIG. 9.

Another embodiment of a magnetic fluid sealed bearing according to the disclosure will be hereinafter described with reference to the accompanying drawings. FIGS. 8 to 10 illustrate a magnetic fluid sealed bearing according to a fourth embodiment of the disclosure. FIG. 8 is an exploded perspective view of the magnetic fluid sealed bearing, FIG. 9 is a sectional view of the magnetic fluid sealed bearing of FIG. 8 along the axial direction, and FIG. 10 is an enlarged sectional view of an essential portion of FIG. 9.

A magnetic fluid sealed bearing 1 (hereunder also referred to as simply the "bearing") may include a bearing body 40 that includes a cylindrical-shaped inner ring 3, a cylindrical-shaped outer ring 5 arranged so as to surround the inner ring 3, and a plurality of rolling members (rolling elements) 7 interposed between the inner ring 3 and the outer ring 5 so as to be rollable therebetween. The rolling members 7 may be retained by an annular-shaped retainer 8 and allow the inner ring 3 and the outer ring 5 to rotate relative to each other.

The inner ring 3, the outer ring 5, and the rolling members 7 may be formed of a magnetic material such as chrome-based stainless steel (SUS440C); and the retainer 8 may be formed of a highly corrosion-resistant, and heat-resistant material such as a stainless steel material (SUS304).

The magnetic fluid sealed bearing 1 may include a pair of magnetic fluid seals 10A, 10B, More specifically, on each side of the bearing body 40 with respect to the shaft direction (the axial direction "X" of the bearing), the magnetic fluid seals 10A, 10B may be disposed in an opening of an annular space 42 between the inner ring 3 and the outer ring 5 with the rolling members 7 disposed therebetween. The pair of magnetic fluid seals 10A, 10B may be integrally retained by the bearing body 40 (the magnetic fluid seals may be integrated with the bearing body 40 to form an unit with the bearing body 40) and serve as a magnetic seal that seals the inside of the bearing body 40.

More specifically, the magnetic fluid seals 10A, 10B may respectively include a ring-shaped polar plate 12A (12B) disposed so as to in contact with an axially outer face of the magnet 12A (12B) that faces the rolling members 7 and disposed on the axially inner side, so as to retain the magnet 12A (12B) from the axially outer side. The magnetic fluid seals 10A, 10B may further respectively include a magnetic fluid 15 retained between the inner ring 3 or the outer ring 5 and the magnet 12A (12B) (retained by a hereunder-described magnetic circuit formed by the magnet 12A (12B)). These components serve as a seal that prevents dusts, water and the like from entering into the rolling members 7.

Thus, the magnet 12A (12B) may be attached to the polar plate 14A (14B) so as to face the rolling members 7 (the polar plate 14A (14B) retains one side of the magnet 12A (12B) and the other side of the magnet 12A (12B) faces the rolling members 7), and either an inner face of the polar plate 14A (14B) disposed closer to the inner ring 103 or an outer face of the polar plate 14A (14B) disposed closer to the outer ring may be fixed. In the embodiment, the polar plate 14A may be fixed to the inner ring side and the polar plate 14B may be fixed to the outer ring side.

The magnet 12A (12B) may be a permanent magnet having a high flux density and a high magnetism, such as a neodymium magnet prepared by sintering. As shown in FIGS. 8 and 10, the magnet 12A (112B) may be previously magnetized such that the magnetic poles (the S-pole, the N-pole) point in the axial direction X. The polar plate 14A (14B) disposed so as to be in contact with the axially outer face of the magnet 12A (12B) may have a ring shape substantially identical to that of the magnet 12A (12B) as described above, and may be formed of chrome-based stainless steel (SUS440C).

The magnet 12A (12B) and the polar plate 14A (14B) are attached to each other when they are assembled into the bearing, and the magnet and the polar plate may be bonded to each other in advance in the embodiment. However, they may not be bonded by magnetic attraction. When these two elements are previously bonded to each other, the magnet 12A (12B) can be readily positioned or centered, and the magnet 12A (12B) and the polar plate 14A (14B) are integrated into a unit that can be readily built in the bearing body 40.

The pair of magnetic fluid seals 10A, 10B will be now described in detail. In one of the pair of magnetic fluid seals 10A, 10B (the magnetic fluid seal disposed on the left side in FIGS. 8 to 10) or the magnetic fluid seal 10A, the magnet 12A may have the size such that its outer diameter is substantially identical to the outer diameter of the polar plate 14A and its inner diameter is larger than the inner diameter of the polar plate 14A. An inner surface of the polar plate 14A disposed closer to the inner ring may be fixed thereto and may be inserted from one side of the opening of the annular space 42 together with the magnet 12A that is bonded on its surface facing the rolling members in order to be attached (press-fitted) to the outer circumference of the inner ring 3. When the polar plate 14A is attached, a clearance S may be created between an inner periphery of the outer ring 5 and the magnet 12A and an outer periphery of the polar plate 14A.

In the other of the pair of magnetic fluid seals 10A, 10B (the magnetic fluid seal disposed on the right side in FIGS. 8 to 10) or the magnetic fluid seal 10B, the magnet 12B may have the size such that its inner diameter is substantially identical to the inner diameter of the polar plate 14B and its outer diameter is smaller than the outer diameter of the polar plate 14B. An outer surface of the polar plate 14B disposed closer to the outer ring may be fixed thereto and may be inserted from the other side of the opening of the annular space 42 together with the magnet 12B that is bonded on its surface facing the rolling members in order to be attached (press-fitted) to the inner circumference of the outer ring 5. When the polar plate 14B is attached, a clearance S may be created between an outer periphery of the inner ring 3 and the magnet 12B and an inner periphery of the polar plate 14B.

In the pair of magnetic fluid seals 10A, 10B, spacers 30A, 30B made of a non-magnetic material may be interposed between the magnet 12A and the inner ring 3 and between the magnet 12B and the outer ring 5. The spacers 30A, 30B may be formed in a ring shape and the magnets 12A, 12B may be respectively attached to the inner and outer rings with the spacer interposed therebetween. Thus, the non-magnetic spacers 30A, 30B do not form a magnetic circuit in small areas near the magnets between the inner ring, outer ring, and the rolling members but may form a magnetic circuit M1 that goes around the rolling members 7. An example of the non-magnetic material for the spacers 30A, 30B may include ceramics (silicon nitride, alumina, zirconia, SiC and the like), non-magnetic steels (austenite stainless steel, titanium, titanium alloy, ultrahard material (tungsten carbide and the like)), copper alloy, plastics, and the like.

More specifically, in one of the magnetic seals or the magnetic fluid seal 10A, the spacer 30A may be disposed within an annular space between the inner periphery of the magnet 12A and the outer periphery of the inner ring 3. The annular space is created due to the size difference of the inner diameter between the polar plate 14A and the magnet 12A. In the other of the magnetic seals or the magnetic fluid seal 10B, the spacer 30B may be disposed within an annular space between the outer periphery of the magnet 12B and the inner periphery of the outer ring 5. The annular space is created due to the size difference of the outer diameter between the polar plate 14B and the magnet 12B.

It is preferable that steps 3a, 5a be formed on the inner ring 3 and the outer ring 5 respectively. The magnets 12A, 12B may be placed in position when the spacers 30A, 30B touch the steps 3a, 5a respectively when they are assembled. On the other sides of the magnets 12A, 12B remote from the spacers, clearances may be created in the axial direction between the side surfaces of the magnets facing the rolling members and the step 5a of the outer ring and the step 3a of the inner ring. By providing the steps 3a, 5a on the inner ring 3 and the outer ring 5 respectively in this manner, it is possible to facilitate the assembling of the magnetic fluid seals 10A, 10B and retention of the magnetic fluid 15 in the axial clearance between the magnet and the step where the density of magnetic flux becomes high when the magnetic circuit M1 that goes around (surrounds) the rolling members 7 is formed, which will be hereunder described in detail.

As described above, in this embodiment, in one of the pair of magnetic seals or the magnetic fluid seal 10A, the magnet 12A may retain the spacer 30A with the inner ring 3 and retain the magnetic fluid 15 with the outer ring 5 (the step 5a). In the other of the pair of magnetic seals or the magnetic fluid seal 10B, the magnet 12B may retain the spacer 30B with the outer ring 5 and retain the magnetic fluid 15 with the inner ring 3 (the step 3a).

Due to the above-described arrangement of the spacers 30A, 30B (staggered arrangement where the radial positions are different from each other), one side of the magnet 12A facing the rolling member 7 in the magnetic fluid seal 10A is magnetized as the south pole and the axially other side of the magnet 12A is magnetized as the north pole. At the same time, in the magnetic fluid seal 10B, one side of the magnet 12B facing the rolling member 7 is magnetized as the south pole and the axially other side of the magnet 12B is magnetized as the north pole. In other words, in this embodiment, the opposing faces of the magnets 12A, 12B magnetized such that the magnetic poles point in the axial direction X of the bearing body 40 have the same magnetic polarity (the S pole in this example) with the rolling members 7 interposed therebetween.

A magnetic circuit formed when the spacers 30A, 30B are provided will be now described. In order to illustrate the main flow of the magnetic lines, FIG. 10 shows the flow in the dotted line. The magnetic line generated from the N pole of the magnet 12B in the magnetic fluid seal 10B may be guided by the polar plate 14B and flows toward the outer ring 5. At this point, a magnetic line does not run toward the S pole of the magnet 12B but runs through the outer ring 5 to the S pole of the magnet 12A in the magnetic fluid seal 10A on the other side because the outer ring 5 and the magnet 12B are (magnetically) separated from each other by the non-magnetic spacer 30B. Moreover, a magnetic line generated from the N pole of the magnet 12A in the magnetic fluid seal 10A may be guided by the polar plate 14A and flows toward the inner ring 3. At this point, the magnetic line does not run toward the S pole of the magnet 12A but runs through the inner ring 3 to the S pole of the magnet 12B in the magnetic fluid seal 10B on the other side because the inner ring 3 and the magnet 12A are separated from each other by the non-magnetic spacer 30A. In other words, the magnetic circuit M1 that penetrates the inner ring 3 and the outer ring 5 (goes through the inner ring 3 and the outer ring 5) and goes around the rolling members 7 may be formed between the magnet 12A in the magnetic fluid seal 10A and the magnet 12B in the magnetic fluid seal 10B.

On the magnetic fluid seal 10A side, the magnetic fluid 15 may be magnetically retained in the clearance between the axially-outside end face (including the edge) of the magnet 12A and the inner periphery of the outer ring 5 (in particular, the step 5a) such that the magnetic fluid 15 completely blocks out the communication of the path from the clearance S to the rolling members 7. On the magnetic fluid seal 10B side, the magnetic fluid 15 may be magnetically retained in the clearance between the axially-inner-side end face (including the edge) of the magnet 12B and the outer periphery of the inner ring 3 (in particular, the step 3a) such that the magnetic fluid 15 completely blocks out the communication of the path from the clearance S to the rolling members 7.

The magnetic fluid 15 injected to block the clearance S may be prepared by dispersing magnetic fine particles such as $Fe_3O_4$ into a base oil using a surfactant (the surfactant may be sprinkled over the magnetic fine particles and the magnetic particles may be then dispersed in the base oil) so as to have viscosity and react with a magnet when brought close thereto. Therefore, once the magnetic fluid 15 is injected into the clearance S by an injection apparatus such as a dropper, the magnetic fluid is stably retained at a certain position, in particular, at the clearance between the step and the magnet where the density of the magnetic flux is high, due to the magnetic circuit Ml. In a case where the polar plates 14A, 14B cannot be press-fitted and fixed to the inner ring 3 and the outer ring 5 respectively, it is preferable that the magnetic fluid 15 be also injected into the fitting portion between the polar plate 14A and the inner ring 3 and the fitting portion between the polar plate 14B and the outer ring 5 (the injection and retention of the magnetic fluid in this manner may be also applied to a configuration illustrated in FIGS. 11 to 13 which will be hereunder described). Thus, the inside of the bearing can be securely sealed with the injected and retained magnetic fluid.

As described above, in the magnetic fluid sealed bearing 1 according to the embodiment, the magnetic circuit M1 that penetrates the inner and outer rings 3, 5 and goes around the rolling members 7 (in the counterclockwise direction in FIG. 10) is formed between the magnet 12A in the magnetic fluid seal 10A and the magnet 12B in the magnetic fluid seal 10B by providing the non-magnetic spacers 30A, 30B. Accordingly, the magnetic force generated by the magnetic circuit M1 does not adversely affect the movement of the rolling members 7 and it is possible to realize a smooth rotation of the rolling members 7 (it is possible to realize a low rotational torque of the rolling members 7). In other words, the magnet in the fluid seal does not form a magnetic circuit in a small area between the magnet and the inner or outer ring disposed close thereto but forms the magnetic circuit M1 over the wide region between the magnet 12A and the magnet 12B in the pair of magnetic fluid seals 10A, 10B disposed on each side of the bearing body 40 in the axial direction X with the rolling members 7 interposed therebetween. Therefore, a strong magnetic force does not act on the rolling members.

The magnets 12A, 12B may be magnetized such that one side of the magnet 12A facing the rolling members 7 is magnetized as the N pole and the axially other side of the magnet 12A is magnetized as the S pole and one side of the magnet 1213 facing the rolling members 7 is magnetized as the N pole and the axially other side of the magnet 12B is magnetized as the S pole. In this case, the direction of the magnet circuit M1 is opposite to that of FIG. 10 (clockwise direction).

Figure 11:
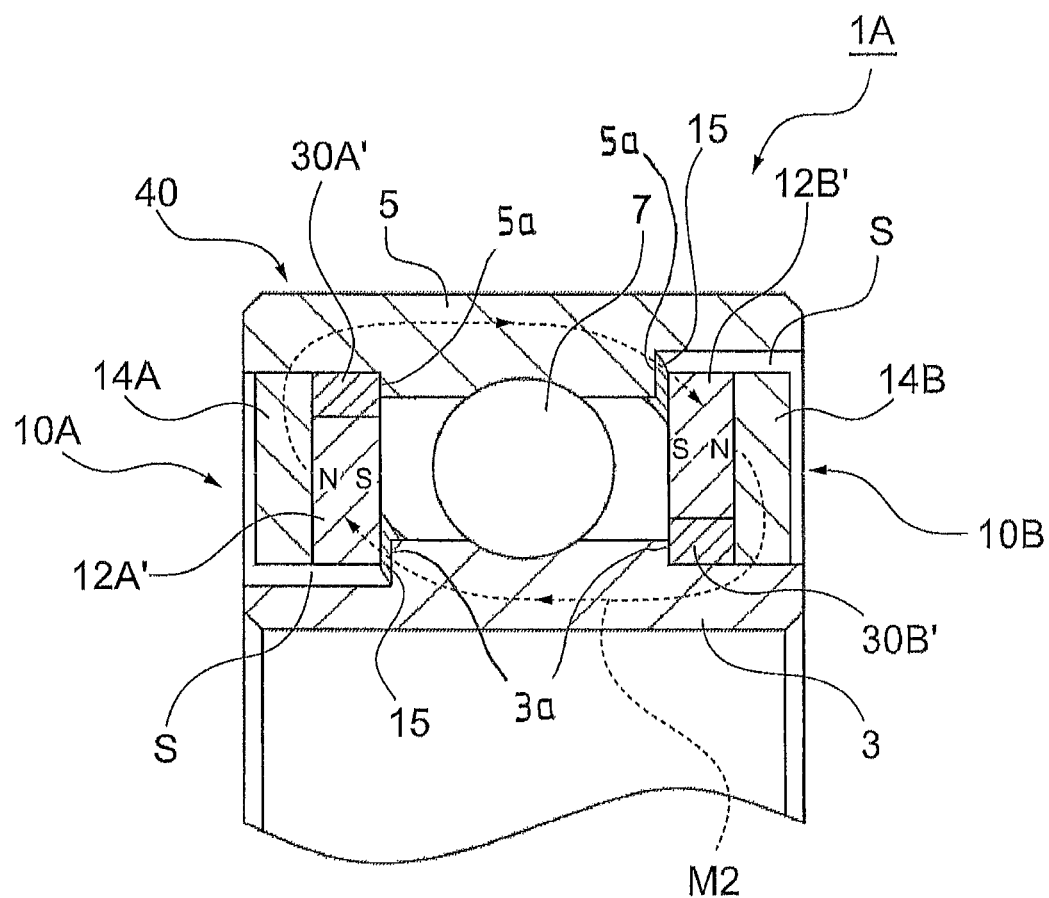
FIG. 11 is an enlarged sectional view of an essential portion of a magnetic fluid sealed bearing along the axial direction according to a modification example of the fourth embodiment.

FIG. 11 is an enlarged sectional view of an essential portion of a magnetic fluid sealed bearing 1A along the axial direction according to a modification example of the fourth embodiment. In this modification example, the arrangement of the magnetic fluid seals 10A, 10B is reversed with respect to that of the forth embodiment.

More specifically, one of the pair of magnetic fluid seals or the magnetic fluid seal 10A (the magnetic fluid disposed on the left side in the FIG. 11) may be fitted or press-fitted in the inner circumference of the outer ring 5, and the magnet 12A' may retain the spacer 30A' with the outer ring 5 and retain the magnetic fluid 15 with the inner ring 3. At the same time, the other of the pair of magnetic fluid seals or the magnetic fluid seal 10B (the magnetic fluid disposed on the right side in the FIG. 11) may be fitted or press-fitted in the outer circumference of the inner ring 3, and the magnet 12B' may retain the spacer 30B' with the inner ring 3 and retain the magnetic fluid 15 with the outer ring 5.

Moreover, in the magnetic fluid seal 10A, one side of the magnet 12A' facing the rolling member 7 may be magnetized as the S pole and the axially other side of the magnet 12A' may be magnetized as the N pole. At the same time, in the magnetic fluid seal 10B, one side of the magnet 12B' facing the rolling member 7 may be magnetized as the S pole and the axially other side of the magnet 12B' may be magnetized as the N pole (the faces of the magnets opposed to each other with the rolling members 7 interposed therebetween are magnetized to have the same magnetic pole).

Thus, a magnetic line generated from the N pole of the magnet 12A' in the magnetic fluid seal 10A may be guided by the polar plate 14A and flows toward the outer ring 5. At this point, the magnetic line does not run toward the S pole of the magnet 12A but runs through the outer ring 5 to the S pole of the magnet 12B' in the magnetic fluid seal 10B on the other side because the outer ring 5 and the magnet 12A' are separated from each other by the non-magnetic spacer 30A'. Moreover, a magnetic line generated from the N pole of the magnet 12B' in the magnetic fluid seal 10B may be guided by the polar plate 14B and flows toward the inner ring 3. At this point, the magnetic line does not run toward the S pole of the magnet 12B' but runs through the inner ring 3 to the S pole of the magnet 12A' in the magnetic fluid seal 10A on the other side because the inner ring 3 and the magnet 12B' are separated from each other by the non-magnetic spacer 30B'. In other words, the magnetic circuit M2 having the direction opposite to that of the magnetic circuit M1 of FIG. 10 is formed.

In the above-described configuration, the magnetic circuit M2 that penetrates the inner and outer rings 3, 5 and goes around the rolling members 7 is formed between the magnet 12A in the magnetic fluid seal 10A and the magnet 12B' in the magnetic fluid seal 10B in the same manner as the previous embodiment, and the same advantageous effects as the above-embodiment can be obtained.

Figure 12:
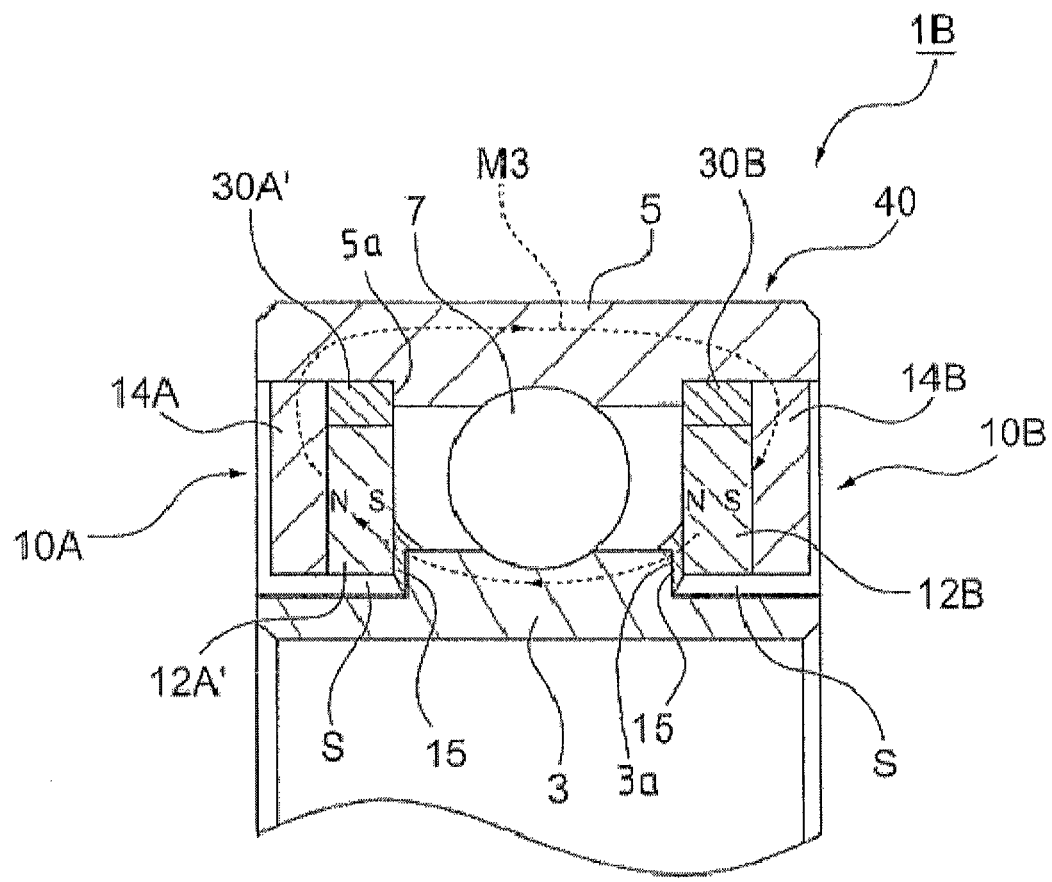
FIG. 12 is an enlarged sectional view of an essential portion of a magnetic fluid sealed bearing along the axial direction according to a fifth embodiment of the disclosure.

FIG. 12 is an enlarged sectional view of an essential portion of a magnetic fluid sealed bearing 1B along the axial direction according to a fifth embodiment of the disclosure. Referring to FIG. 12, the spacers 30A', 30B may be retained by the magnets 12A', 12B in the pair of magnetic fluid seals 10A, 10B with the outer ring 5. Moreover, the magnets 12A', 12B in the pair of magnetic fluid seals 10A, 10B may be magnetized such that the sides of the magnets 12A', 12B opposed to each other are magnetized to have different magnetic polarities from each other.

More specifically, one of the pair of magnetic fluid seals or the magnetic fluid seal 10A (the magnetic fluid disposed on the left side in the FIG. 12) may be press-fitted in the inner circumference of the outer ring 5, and the magnet 12A' may retain the spacer 30A' with the outer ring 5 and retain the magnetic fluid 15 with the inner ring 3. At the same time, the other of the pair of magnetic fluid seals or the magnetic fluid seal 10B (the magnetic fluid disposed on the right side in the FIG. 12) may be press-fitted in the inner circumference of the outer ring 5, and the magnet 12B may retain the spacer 30B with the outer ring 5 and retain the magnetic fluid 15 with the outer ring 3.

Thus, a magnetic line generated from the N pole of the magnet 12A' in the magnetic fluid seal 10A may be guided by the polar plate 14A and flows toward the outer ring 5. At this point, the magnetic line does not run toward the S pole of the magnet 12A' but runs through the outer ring 5 to the magnetic fluid seal 10B on the other side because the outer ring 5 and the magnet 12A' are separated from each other by the non-magnetic spacer 30A'. The magnetic line further runs toward the S pole of the magnet 12B because the outer ring 5 and the magnet 12B are separated from each other by the non-magnetic spacer 30B. A magnetic line starting from the N pole of the magnet 12B in the magnetic fluid seal 10B runs toward the inner ring 3, penetrates the inner ring 3 and then runs toward the S pole of the magnet 12A' disposed on the other side in the magnetic fluid seal 10A. In other words, the magnetic circuit M3 that penetrates the inner ring 3 and the outer ring 5 and goes around the rolling members 7 may be formed between the magnet 12A' in the magnetic fluid seal 10A and the magnet 12B in the magnetic fluid seal 10B.

As described above, in this embodiment, the magnetic circuit M3 that penetrates the inner and outer rings 3, 5 and goes around the rolling members 7 is also formed between the magnet 12A' in the magnetic fluid seal 10A and the magnet 12B in the magnetic fluid seal 10B by providing the non-magnetic spacers 30A', 30B. Accordingly, the magnetic force generated by the magnetic circuit M3 does not adversely affect the movement of the rolling members 7 and it is possible to realize a smooth rotation of the rolling members 7.

Figure 13:
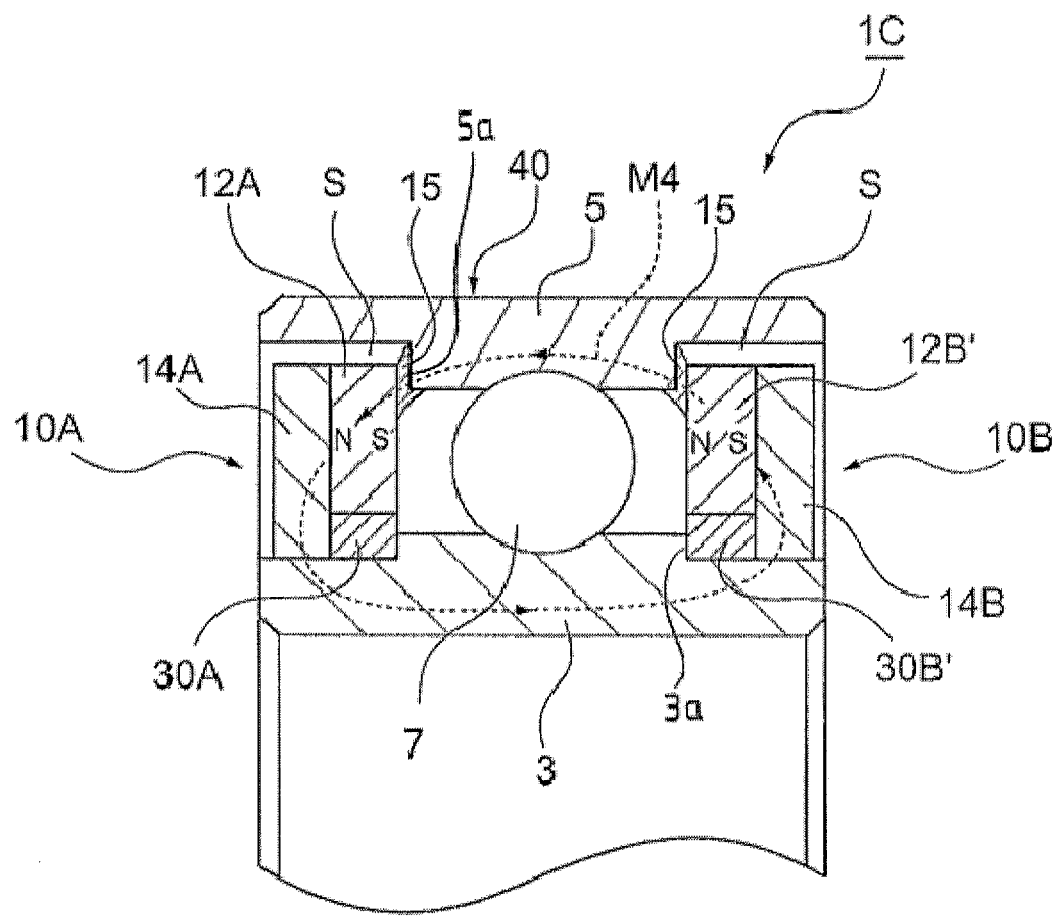
FIG. 13 is an enlarged sectional view of an essential portion of a magnetic fluid sealed bearing along the axial direction according to a modification example of the fifth embodiment.

FIG. 13 is an enlarged sectional view of an essential portion of a magnetic fluid sealed bearing 1C along the axial direction according to a modification example of the fifth embodiment. Referring to FIG. 13, the spacers 30A, 30B' may be retained by the magnets 12A, 12B' in the pair of magnetic fluid seals 10A, 10B with the inner ring 3 in this modification example.

More specifically, the magnetic fluid seal 10A may be fitted or press-fitted in the outer circumference of the inner ring 3, and the magnet 12A may retain the spacer 30A with the inner ring 3 and retain the magnetic fluid 15 with the outer ring 5. At the same time, the magnetic fluid seal 10B may be fitted or press-fitted in the outer circumference of the inner ring 3, and the magnet 12B' may retain the spacer 30B' with the inner ring 3 and retain the magnetic fluid 15 with the outer ring 5. In the same manner as the fifth embodiment, the magnets 12A, 12B' in the pair of magnetic fluid seals 10A, 10B may be magnetized such that the sides of the magnets 12A, 12' opposed to each other with the rolling members interposed therebteween are magnetized to have different magnetic polarities from each other.

Thus, a magnetic line generated from the N pole of the magnet 12A in the magnetic fluid seal 10A may be guided by the polar plate 14A and flows toward the inner ring 3. At this point, the magnetic line does not run toward the S pole of the magnet 12A but runs through the inner ring 3 to the magnetic fluid seal 10B on the other side because the inner ring 3 and the magnet 12A are separated from each other by the non-magnetic spacer 30A. The magnetic line further runs toward the S pole of the magnet 12B' because the inner ring 3 and the magnet 12B' are separated from each other by the non-magnetic spacer 30B'. A magnetic line starting from the N pole of the magnet 12B in the magnetic fluid seal 10B runs toward the outer ring 5, penetrates the outer ring 5 and then runs toward the S pole of the magnet 12A disposed on the other side in the magnetic fluid seal 10A. In other words, the magnetic circuit M4 that penetrates the inner ring 3 and the outer ring 5 and goes around the rolling members 7 may be formed between the magnet 12A in the magnetic fluid seal 10A and the magnet 12B' in the magnetic fluid seal 10B.

In this modification example, the magnetic circuit M4 that penetrates the inner and outer rings 3, 5 and goes around the rolling members 7 is formed between the magnet 12A in the magnetic fluid seal 10A and the magnet 12B' in the magnetic fluid seal 10B by proving the non-magnetic spacers 30A, 30B', and the same advantageous effects as the above-embodiment can be obtained.

The bearing equipped with the above-described magnetic fluid seal can be used for rotation shafts of various apparatuses that require a water and dust prevention feature. Among others, apparatuses used in an environment containing salt (seawater) tend to be exposed to harsh conditions.

More specifically, since the seawater has a low viscosity, it can easily penetrate into the apparatus. Once entered inside, the seawater may be dried and salt is crystallized and remains inside. If the crystal of the salt is attached to the rolling members, the rotation performance is significantly reduced.

Therefore, when the above-described magnetic fluid sealed bearing 1, 1A, 1B, 1C is provided in a drive shaft portion of a drive force transmission section in various fishing reels used on the beach or over the sea, it is possible for the bearing to support the drive shaft portion for a long period of time. For example, it is preferable that the bearing according to the above-described embodiments be provided in a rotation shaft portion (for example, a pinion shaft) rotationally driven by a handle of a spinning reel, a spool shaft portion of a double-bearing reel and the like. The bearing according to the above-described embodiments may also be applied to a one-way clutch bearing.

Figure 14:
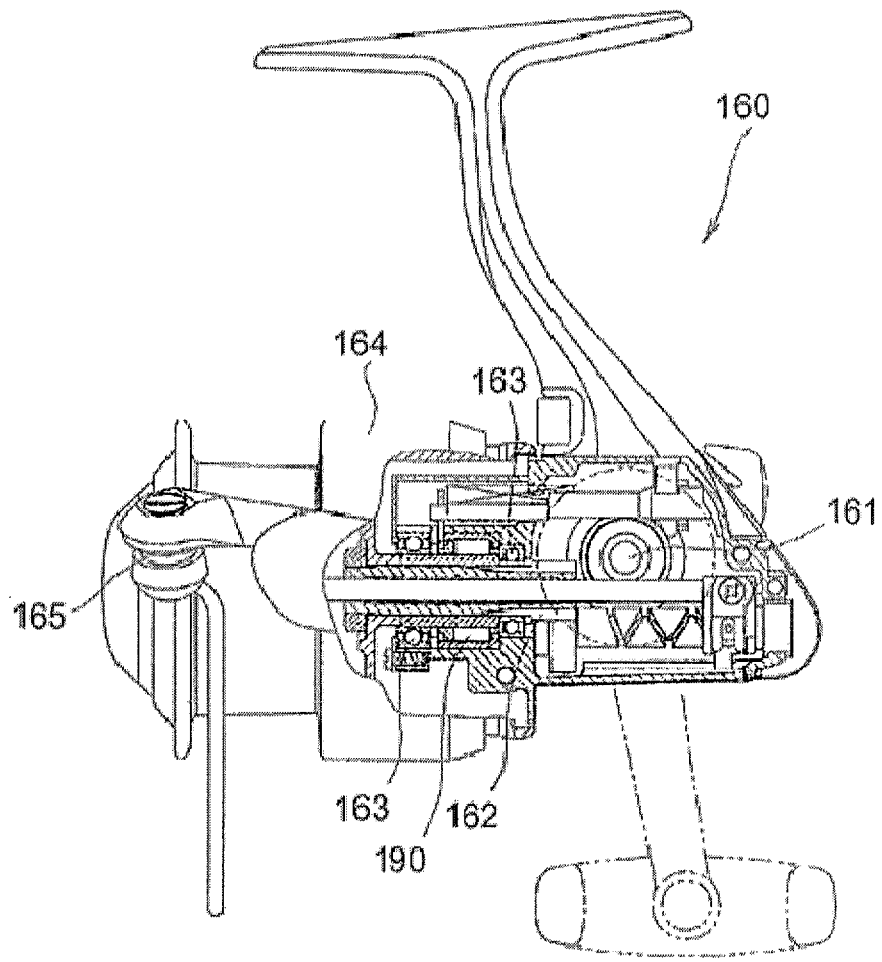
FIG. 14 is a sectional view of a portion of a fishing reel (spinning reel) in which the magnetic fluid sealed bearing according to the disclosure is provided on a rotation shaft.
Figure 15:
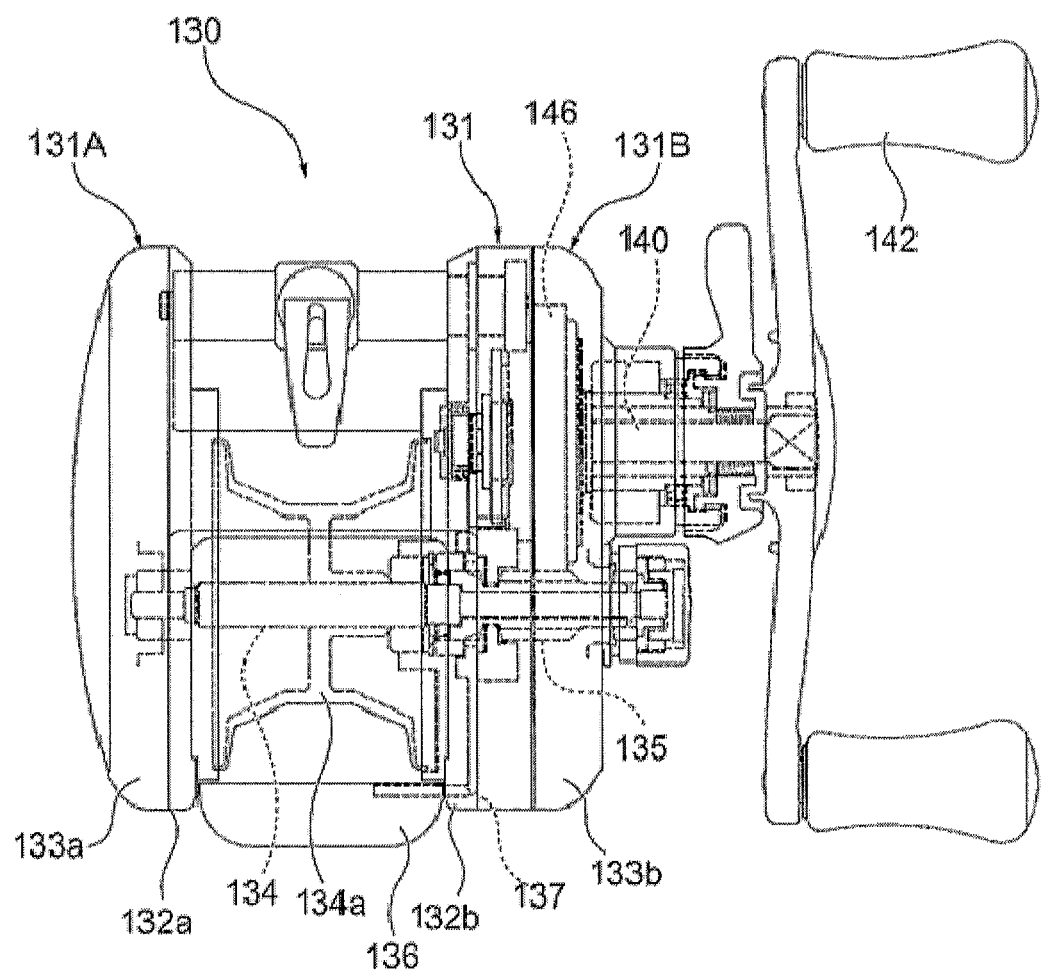
FIG. 15 is a plan view of a fishing reel (double bearing reel) in which the magnetic fluid sealed bearing according to the disclosure is provided on a rotation shaft.
Figure 16:
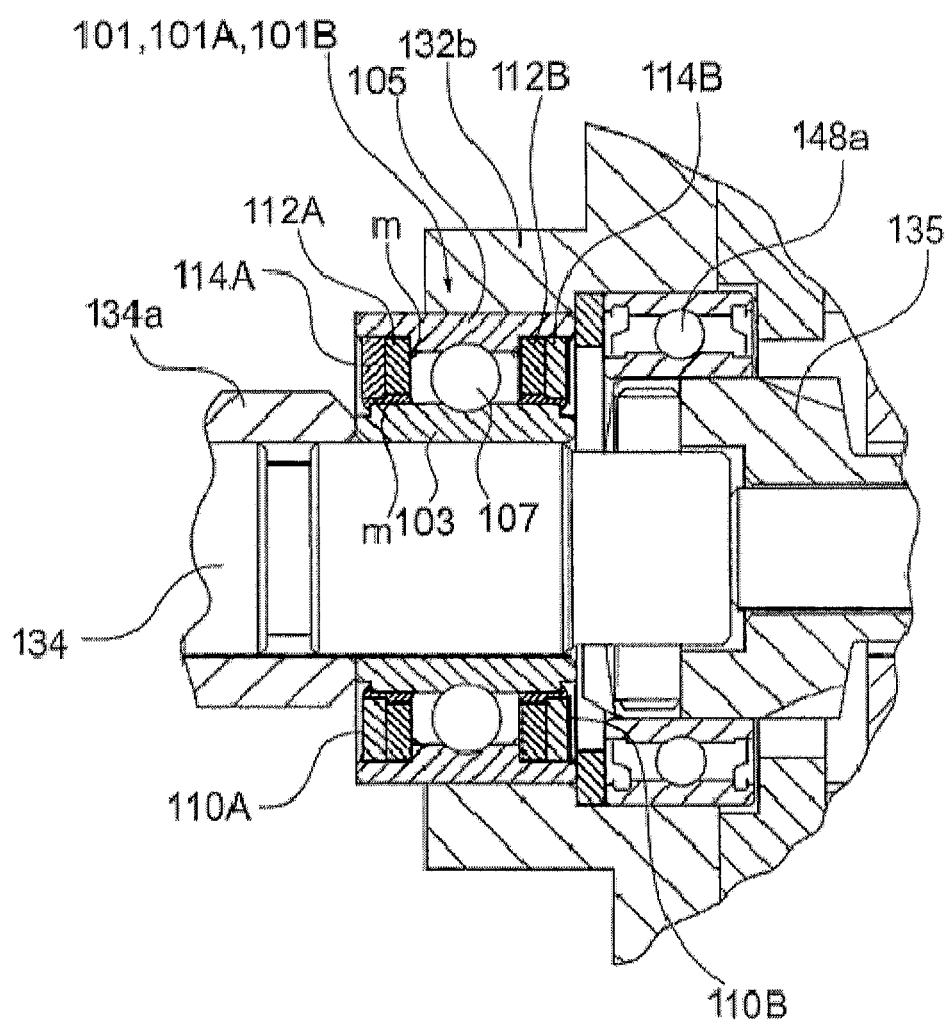
FIG. 16 is an enlarged sectional view of a spool shaft portion of the fishing reel shown in FIG. 15.
Figure 17:
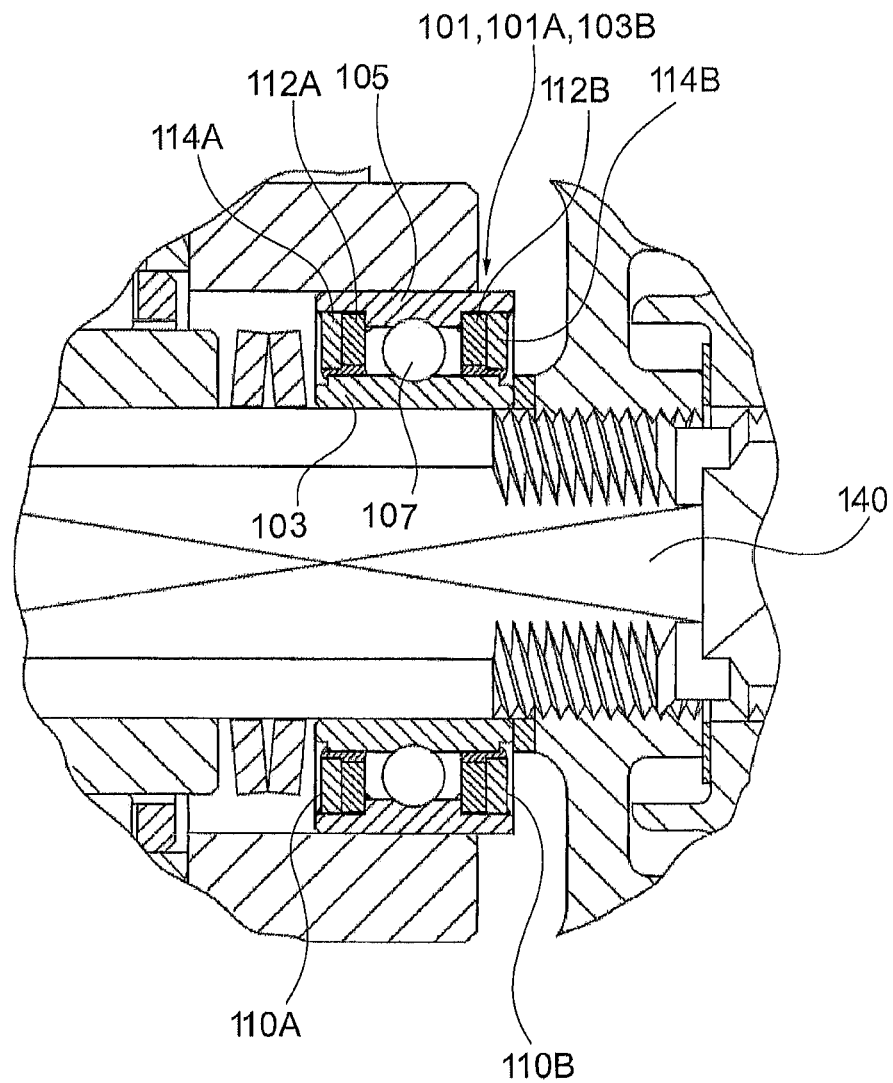
FIG. 17 is an enlarged sectional view of a handle shaft portion of the fishing reel shown in FIG. 15.

An example of a spinning reel and a double-bearing reel to which the magnetic fluid sealed bearing can be applied will be now described with reference to FIGS. 14 to 17. FIGS. 14 to 17 illustrate one embodiment of a fishing reel according to the disclosure. FIG. 14 is a sectional view of a portion of a fishing reel (spinning reel) in which the magnetic fluid sealed bearing according to the disclosure is provided on a rotation shaft. FIG. 15 is a plan view of a fishing reel (double bearing reel) in which the magnetic fluid sealed bearing according to the disclosure is provided on a rotation shaft. FIG. 16 is an enlarged sectional view of a spool shaft portion of the fishing reel shown in FIG. 15. FIG. 17 is an enlarged sectional view of a handle shaft portion of the fishing reel shown in FIG. 15.

In the embodiment illustrated in FIGS. 14 to 17, the above-described magnetic fluid sealed bearing 101, 101A, 101B is provided as a support member for a handle shaft that rotatably supports a spool shaft and a handle shaft of a handle that is used for winding operation.

More specifically, in a fishing spinning reel 160 shown in FIG. 14, the magnetic fluid sealed bearing 101, 101A, 101B (the magnetic fluid sealed bearing 101, 101A, 101B is applied to the bearing 63) may be provided in a rotation shaft portion rotatably driven by a handle rotational operation, such as a handle shaft 61, a pinion shaft 62 and the like. The magnetic fluid sealed bearing 101, 101A, 101B may also be provided to a support portion of a line roller 65 that guides a fishing line to a spool 164.

The magnetic fluid sealed bearing 101, 101A, 101B may also be applied to a double-bearing reel illustrated in FIGS. 15 to 17. A reel body 131 of a double bearing reel 130 illustrated in FIG. 15 may include a left side plate 131A having a left frame 132a and a cover member 133a attached thereto and a right side plate 131B having a right frame 132b and a cover member 133b attached thereto. Between the left and right side plates 131A, 131B, a spool shaft 134 may be rotatably supported via the above-described bearing 101, 101A. 101B. A spool 134a for winding a fishing line may be integrally fixed on the spool shaft 134. An outer ring 105 of the bearing 101 is attached to the left and right frames 132a, 132b and thereby the spool shaft 134 is made rotatable. The magnetic fluid sealed bearing 101,101A, 101B according to the disclosure may also be applied to a one-way bearing 190.

On the end of the spool shaft 134 may be mounted a pinion gear 135 movable along the axial direction of the spool shaft 134. The pinion gear may either support the spool shaft 134 extended coaxially with the pinion gear or rotatably support a spindle rotatably disposed coaxially with the spool shaft 134.

The pinion gear 135 can be moved by a well-known switching means between an engagement position where the pinion gear 135 engages with the spool shaft 134 and rotates integrally with the spool shaft 134 (a power transmitting state or a clutch-on state) and a non-engagement position where the pinion gear 135 is disengaged from the spool shaft 134 (an idling state or a clutch-off state). The switching means may include a switching lever 136 disposed between the left and right side plates 131A, 131B and a clutch plate 137 that rotates upon depressing of the switch lever 136. When the switching lever 136 is depressed, the switching means may switch from the power transmitting state to the idling state via the clutch plate 137.

Within the right side plate 131B, a handle shaft 140 may be rotatably supported via bearing disposed between the right frame 132b and the plate and between the right cover 133b and the plate and the magnetic fluid sealed bearing 101, 101A, 101B. A handle 142 may be mounted on an end of the handle shaft 140. Between the handle shaft 140 and the right cover member 133b may be disposed a one-way clutch 145 as a backstop; and the handle shaft 140 (handle 142) may be rotated only in the direction of winding the fishing line and prevented from rotating reversely.

The pinion gear 135 may be meshed with a drive gear 146 supported by the handle shaft 140; and when the handle 142 mounted on the end of the handle shaft 140 is rotationally operated, the spool shaft 134 may be rotationally driven via the drive gear 146 and the pinion gear 135, and accordingly the spool 134a may be rotated to wind the fishing line.

Among others, this type of fishing reels requires a high rotation performance of the spool 134a, a conventional bearing therein could not be effectively sealed. While in the fishing reel with the above-described magnetic fluid sealed bearing 101, 101A, 101B, it is possible to obtain the water and dust proof effects and to maintain the rotation performance of the spool. More specifically, even if the fishing reel with the bearing of the disclosure is used in a harsh environment where seawater tends to adhere to and penetrate into the bearing, the seawater is shut out from the interior of the bearing that rotatably supports the rotation shaft (the spool shaft 134, the handle shaft 140), so as to securely prevent degradation of smoothness and maintain stable sealing and smooth rotation of the rotation shaft for a long period.

The sizes of the bearings used for the spool shaft 134 and the handle shaft 140 fall within a certain range (for example, the outer diameter is about 10-20 mm and the inner diameter is about 3-10 mm), and the magnetic fluid sealed bearing 101, 101A, 101B having such size can obtain a sufficient sealing effect and can have a low torque when the clearance "G" shown in FIG. 3 is set to 0.05-0.3 mm, preferably to 0.1-0.2 mm. The double bearing reel of the embodiment may have the same sealing structure of the bearing 101, 101A, 101B in the bearings 148a, 148b rotatably supporting the pinion gear 135 and in the bearing that rotatably supporting the handle shaft at the proximal end of the handle shaft 140.

When the above-described magnetic fluid sealed bearing 101, 101A, 101B is built into position, a magnetic body (magnetic material) presenting around the position may attract the bearing 1 to reduce the built-in work efficiency or may form another magnetic circuit in the vicinity to move the magnetic fluid and reduce the sealing quality. To facilitate built-in of the above magnetic fluid sealed bearing 101, 101A, 101B into the frame and cover of the reel body, the parts radially or axially adjacent to the bearing 1, such as the reel body, the frame, the shafts, the cover, and a housing, should preferably be made of a nonmagnetic material (aluminum, austenite-based stainless steel, copper alloy, resin, etc.). Such configuration may enhance the built-in work efficiency and maintain a secured sealing quality. The embodiments illustrated in the drawings are merely examples and it is understood that the magnetic fluid sealed bearing 1, 1A, 1B, 1C may be used instead of the magnetic fluid sealed bearing 101, 101A, 101B.

Embodiments of the present invention are not limited to the above descriptions and are susceptible to various modifications for implementation.

The above described magnetic sealing mechanism is a mere example and is susceptible of appropriate modifications in configuration and arrangement of the magnet and the polar plate. For instance, other alignment methods can be applied to the outer and inner rings in the axial direction and other sealing methods can be applied to the surfaces of the outer and inner rings.

According to the disclosure, in the configuration where the magnetic fluid seal is provided on each side of the rolling members of the bearing, arrangements and composition of the magnetic fluid seal may be adequately modified as long as a magnetic circuit that penetrates the inner and outer rings and goes around the rolling members is formed between the magnet of one of the pair of magnetic fluid seal and the magnet of the other of the pair of magnetic fluid seal. Moreover, configuration and the thickness of the spacer may be adequately modified.

What is claimed is:

1. A magnetic fluid sealed bearing, comprising:
   a bearing body, the bearing body including an inner ring, an outer ring, and a plurality of rolling members interposed between the inner ring and the outer ring;
   a pair of ring-shaped magnets disposed in an annular space between the inner ring and the outer ring, the pair of ring-shaped magnets being disposed on each side of the bearing body in an axial direction with the rolling members interposed therebetween;
   polar plates retaining the magnets respectively; and
   magnetic fluid retained by a magnetic circuit formed by the pair of magnets to seal the rolling members,
   wherein the pair of magnets are magnetized such that magnetic poles point in the axial direction of the bearing body, and opposing sides of the pair of magnets have different magnetic polarities from each other; and
   wherein the magnetic fluid is retained either between the polar plates and an outer circumferential surfaces of the inner ring or between the polar plates and an inner circumferential surface of the outer ring.

2. The magnetic fluid sealed bearing of claim 1, wherein a magnetic force generated by the pair of magnets and acting on the rolling members is larger in the axial direction than that in a radial direction of the bearing body.

3. The magnetic fluid sealed bearing of claim 2, wherein a magnetic flux penetrating the rolling members starts from one of the pair of magnets and flows toward the other of the pair of magnets.

4. The magnetic fluid sealed bearing of claim 3, wherein the amount of a magnetic flux penetrating a magnetic circuit formed by the pair of magnets, the rolling members, and the inner ring is substantially same as the amount of a magnetic flux penetrating a magnetic circuit formed by the pair of magnets, the rolling members, and the outer ring.

5. The magnetic fluid sealed bearing of claim 1, wherein the rolling members are disposed at a midpoint of a distance between the pair of magnets, and the magnitude of an attraction force acting on the rolling members from one of the pair of magnets is substantially equal to the magnitude of an attraction force acting on the rolling members from the other of the pair of magnets.

6. The magnetic fluid sealed bearing of claim 1 further comprising:
   wherein the polar plates are provided on one side of each of the magnets or both sides of each of the magnets.

7. A fishing reel, comprising the magnetic fluid sealed bearing of claim 1 as a support member that supports a rotation shaft rotatable.

8. A magnetic fluid sealed bearing, comprising:
   a bearing body, the bearing body including a magnetic inner ring, a magnetic outer ring, and a plurality of magnetic rolling members disposed rollable between the inner ring and the outer ring; and
   a pair of magnetic fluid seals integrally retained on each side of the bearing body respectively in an axial direction with the rolling members interposed therebetween so as to magnetically seal an inner portion of the bearing body,
   wherein each of the pair of magnetic fluid seals includes a magnet, a polar plate retaining the magnet, and magnetic fluid retained in a clearance between the inner or outer ring and the magnet, and
   the magnet in each of the pair of magnetic fluid seals is attached to one of the inner and outer rings with a non-magnetic spacer interposed therebetween and retains the magnetic fluid on the other of inner and outer rings to seal the rolling members.

9. The magnetic fluid sealed bearing of claim 8, wherein the magnet in one of the pair of magnetic fluid seals retains the spacer with the inner ring and the magnet in the other of the pair of magnetic fluid seals retains the spacer with the outer ring,
   the magnets in the pair of magnetic fluid seals are magnetized such that magnetic poles point in the axial direction of the bearing body, and
   the magnet in one of the pair of magnetic fluid seals and the magnet in the other of the pair of magnetic fluid seals are arranged such that sides of the magnets opposed to each other with the rolling members interposed therebetween have the same magnetic polarity.

10. The magnetic fluid sealed bearing of claim 8, wherein the magnet in each of the pair of magnetic fluid seals retains the spacer with the inner or outer ring, and is magnetized such that magnetic poles point in the axial direction of the bearing body, and
    the magnet in one of the pair of magnetic fluid seals and the magnet in the other of the pair of magnetic fluid seals are arranged such that sides of the magnets opposed to each other with the rolling members interposed therebetween have different magnetic polarities from each other.

11. The magnetic fluid sealed bearing of claim 8, wherein a step is formed on each of the inner and outer rings,
    the magnet in each of the pair of magnetic fluid seals is disposed in position in the axial direction when its spacer touches the step of the one of the inner and outer rings to which it is attached, and
    a clearance is provided between a surface of each magnet and the other of the inner or outer rings, wherein the magnetic fluid is retained in the clearance.

* * * * *